United States Patent
Davies et al.

(10) Patent No.: US 12,248,916 B1
(45) Date of Patent: Mar. 11, 2025

(54) SYSTEM AND METHOD FOR AUTOMATED DETERMINATION OF NAME, IMAGE AND LIKENESS FULFILLMENT

(71) Applicant: NIL Management Systems, LLC, Wilmington, DE (US)

(72) Inventors: Richard Davies, Charlotte, NC (US); Kendall Alley, Charlotte, NC (US); James Grams, Charlotte, NC (US); Kevin Gemas, Thiensville, WI (US)

(73) Assignee: NIL Management Systems, LLC, Charlotte, NC (US)

( * ) Notice: Subject to any disclaimer, the term of this patent is extended or adjusted under 35 U.S.C. 154(b) by 0 days.

(21) Appl. No.: 18/476,698

(22) Filed: Sep. 28, 2023

Related U.S. Application Data

(63) Continuation of application No. 18/054,051, filed on Nov. 9, 2022, now Pat. No. 11,829,968.

(60) Provisional application No. 63/294,021, filed on Dec. 27, 2021.

(51) Int. Cl.
  *G06Q 20/10* (2012.01)
  *G06Q 30/0201* (2023.01)
  *G06Q 50/00* (2012.01)

(52) U.S. Cl.
  CPC ....... *G06Q 20/108* (2013.01); *G06Q 30/0201* (2013.01); *G06Q 30/0206* (2013.01); *G06Q 50/01* (2013.01)

(58) Field of Classification Search
  CPC .................................................. G06Q 20/108
  See application file for complete search history.

(56) References Cited

U.S. PATENT DOCUMENTS

| | | |
|---|---|---|
| 10,002,358 B1 | 6/2018 | George et al. |
| 2006/0085254 A1 | 4/2006 | Grim, III et al. |
| 2006/0089898 A1 | 4/2006 | Durkin et al. |
| 2019/0236559 A1 | 8/2019 | Padmanabhan |
| 2019/0325507 A1 | 10/2019 | Rowley et al. |
| 2020/0364588 A1* | 11/2020 | Knox ............... G06V 40/20 |
| 2021/0042767 A1* | 2/2021 | Guan ............ G06Q 30/0255 |
| 2021/0081463 A1 | 3/2021 | Walker et al. |
| 2021/0233108 A1* | 7/2021 | Gouneili ......... H04N 21/6582 |
| 2021/0374879 A1 | 12/2021 | Varela et al. |

* cited by examiner

*Primary Examiner* — Scott C Anderson
(74) *Attorney, Agent, or Firm* — Morgan, Lewis & Bockius LLP

(57) ABSTRACT

A method of automatically determining fulfillment of services performed by a first entity, the method including at a management server, determining one or more first entities having one or more service agreement obligations to one or more second entities, and extracting content data from one or more websites and/or servers hosting the one or more websites. The content data includes one or more separate and distinct event datasets, each event dataset being generated by a particular first entity of the one or more first entities. Determining, for each event dataset, whether the event dataset includes an indication of a particular second entity. Determining whether the particular first entity and particular second entity have service agreement specific information, and in response to determining that the particular first entity and particular second entity are indicated in the service agreement specific information, automatically determining that a service agreement obligation has been fulfilled.

14 Claims, 24 Drawing Sheets

Profile | Fulfillment | Documents | Messages | Help

GENERAL

Suppress Welcome Email

*Name
[Athlete First and Last Name]

*Sport
[ ▼ ]

CONTACT

*Email
[✉ Athlete.Name@email.com]

*Phone
[+1 ▼] [555-555-5555]

SOCIAL MEDIA

Social Media Platform 1
[Athlete Public Username 1]

Social Media Platform 2
[Athlete Public Username 2]

Social Media Platform 3
[Athlete Public Username 3]

| Athlete First and Last Name |

* Sport

| Football ⌄ |

Baseball
Cross Country
Football
Men's Basketball
Men's Golf
Men's Soccer
Men's Tennis
Gymnastics
Lacrosse
Rowing
Softball
Track & Field
Volleyball
Women's Basketball
Women's Golf
Women's Soccer
Women's Tennis
Other Social Media Platform 2

| Athlete Public Username 2 |

Social Media Platform 3

| Athlete Public Username 3 |

Social Media Platform 4

| Athlete Public Username 4 |

| CALCULATIONS | 210a | Hide |

Position

CB ▼

Factor 1     7

―――――●――

Factor 2     50

―――●―――――

Factor 3     0

○――――――――

Social Media Followers

70000    ~210b

Boolean Factor 1 ⊙

Fixed Purse    210c $

Contract Months

12

[ Calculate ]

CALCULATIONS 210a
Position

CB ▼

Factor 1     7

Factor 2     50

Factor 3     0

Social Media Followers

70000

— 210b

Boolean Factor 1 ⬤

Fixed Purse    210c $

Contract Months

12

[ Calculate ] [ $10,164 ] — 212

CALCULATIONS — 210a
Position
CB

Factor 1 — 7
Factor 2 — 50
Factor 3 — 0

Social Media Followers
70000
— 210b

Boolean Factor 1 ⊙ — 210c

Fixed Amount
$ 200,000

Contract Months — 210d
12

[Calculate] $83,291 — 212

Organization Social Media

Social Media Platform 1
[ Organization Public Username 1 ]

Social Media Platform 4
[ Organization Public Username 4 ]

Social Media Platform 4
[ Organization Public Username 4 ]

Social Media Platform 4
[ Organization Public Username 4 ]

Athlete-Organization Contract

Contract Start Date
[ 09/22/2022 ] — 226

* Contract Amount
[ $ 25000 ] — 228

Payout Schedule
[ Standard ▾ ] — 230

[ Add Organization ]

| ⊞ COMPLIANCE | ⌄ |

+ ADD ⌃

Please provide a link, note, and/or media.

Link — 244a

🔗 https://webaddress.com

Note — 244b

Placeholder Text

Files — 244c

[Choose Files] No file chosen

*Date — 244d mm/dd/yyyy 📅

Organization — 244e

Organization 1 ⌄

In-Person Appearance ⊙ — 244f

Approved ⊙ — 244g

244h

Add

Choose an Athlete

[dropdown] — 200

| Profile | *Fulfillment* | Documents | Messages | Help | 202 |

🏢 COMPLIANCE

View for Date

`09/01/2022` 📅

[ Download Payment Report ]

[ Remind All Flagged Athletes ]

Compliance: 0/8 (0%)    240a

---

STUDENT ATHELETE 1

ORGANIZATION 1
   : @Organization1PublicUsername1   : @Organization1PublicUsername2

⚑ COMPLIANCE
| | |
|---|---|
| Posts: | 0/2 required before 8/1 |
| Approved Posts: | 0/2 required before 8/1 |
| In-Person Apperances: | 0/2 required before 5/1/23 |
| Approved In-Person Apperances: | 0/2 required before 5/1/23 |
| Payment Due 8/1: | $0/$600 |

✉ 💬

---

STUDENT ATHELETE 2

ORGANIZATION 2
   : @Organization2PublicUsername1   : @Organization2PublicUsername2

✓ COMPLIANCE
| | |
|---|---|
| Posts: | 0/2 required before 8/1 |
| Approved Posts: | 0/2 required before 8/1 |
| In-Person Apperances: | 0/2 required before 6/1/23 |
| Approved In-Person Apperances: | 0/2 required before 6/1/23 |
| Payment Due 8/1: | $3,300/$3,300 |

240b     Fig. 5C     232

SYSTEM AND METHOD FOR AUTOMATED DETERMINATION OF NAME, IMAGE AND LIKENESS FULFILLMENT

CROSS-REFERENCE TO RELATED APPLICATIONS

This application is a Continuation Application of U.S. patent application Ser. No. 18/054,051 filed Nov. 9, 2022, which claims the benefit of U.S. Provisional Patent Application No. 63/294,021 filed Dec. 27, 2021 entitled "PIF Portal", each of which is incorporated by reference herein in its entirety.

TECHNICAL FIELD

The present invention generally relates to the field of name, image and likeness (NIL) monitoring and, more particularly, to systems and methods for automating the onboarding, fulfillment tracking and payout relating to NIL activities.

BRIEF SUMMARY OF THE INVENTION

In one embodiment there is a method of automatically determining fulfillment of services associated with service agreements between a first entity and a second entity, the method includes at a management server in communication with a database, determining one or more first entities having one or more service agreement obligations to one or more second entities based on service agreement specific information stored on the database, the service agreement specific information including information relating to one or more separate and distinct service agreements between a particular first entity and a particular second entity. The method further includes at the management server, via an application programming interface (API), extracting content data from one or more websites and/or servers hosting the one or more websites, wherein the content data includes one or more separate and distinct event datasets, wherein each event dataset was generated by a particular first entity of the one or more first entities. The method further includes at the management server, determining, for each event dataset, whether the event dataset includes an indication of a particular second entity of the one or more second entities. In response to the event dataset including an indication of the particular second entity, at the management server, determining whether the particular first entity and particular second entity is indicated in the service agreement specific information, and in response to determining that the particular first entity and particular second entity are indicated in the service agreement specific information, transmitting from the management server to the database that a service agreement obligation has been fulfilled.

In some embodiments, the method further includes removing all event datasets including no indication of any second entity included in the one or more second entities. In some embodiments, the one or more first entities are one or more student athletes each having student athlete specific information stored on the database, and the one or more second entities are one or more organizations each having organization specific information stored on the database. In some embodiments, for each particular student athlete of the one or more student athletes, the corresponding athlete specific information includes one or more student athlete social media handles associated with one or more social media platforms, and for each particular organization of the one or more organizations, the corresponding organization specific information includes one or more organization social media handles associated with the one or more social media platforms.

In some embodiments, the one or more websites and/or servers hosting the one or more websites are associated with the one or more social media platforms. In some embodiments, at the management server, extracting content data includes retrieving, for each social media platform included in the one or more social media platforms and for each particular student athlete: one or more social media posts associated with the particular student athletes student athlete social media handle, and generating social media post data for each of the one or more social media posts. In some embodiments, determining whether the event dataset includes an indication of a particular second entity includes automatically determining, at the management server, that one or more social media post data includes organization specific information for a particular organization. In some embodiments, the one or more social media post data includes text matching an organization social media handle stored on the database.

In some embodiments, the management server is configured to extract content data at a predetermined interval. In some embodiments, at the management server, extracting content data includes web scraping the one or more websites. In some embodiments, the management server is in communication with the servers hosting the one or more websites via one or more server specific application programming interfaces. In some embodiments, the one or more service agreement obligations include any combination of social media posts and in-person appearances. In some embodiments, the method further includes at the management server, automatically determining a fair market value for each particular first entity of the one or more first entities based on a weighted sum of two or more fair market value factors. In some embodiments, the method further includes, at the management server, automatically determining, a payout amount associated with the fulfillment of all service agreement obligations between the particular first entity and a particular second entity of the one or more second entities, based on the determined fair market value. In some embodiments, the method further includes in response to the database including an indication that all service agreement obligations between the particular first entity and the particular second entity are fulfilled, at the management server, generating a disbursement of the payout amount to the first entity.

BRIEF DESCRIPTION OF THE DRAWINGS

The foregoing summary, as well as the following detailed description of embodiments of the system and method for virtual assistant enhanced access of private information, will be better understood when read in conjunction with the appended drawings of an exemplary embodiment. It should be understood, however, that the invention is not limited to the precise arrangements and instrumentalities shown.

In the drawings:

FIGS. 4A-4B illustrate exemplary user interfaces generated by the management server associated with entry of NIL activity information into the system for NIL management;

FIGS. 5A-5C illustrate exemplary user interfaces generated by the management server associated with monitoring of compliance with contractual obligations.

DETAILED DESCRIPTION

Figure 1:
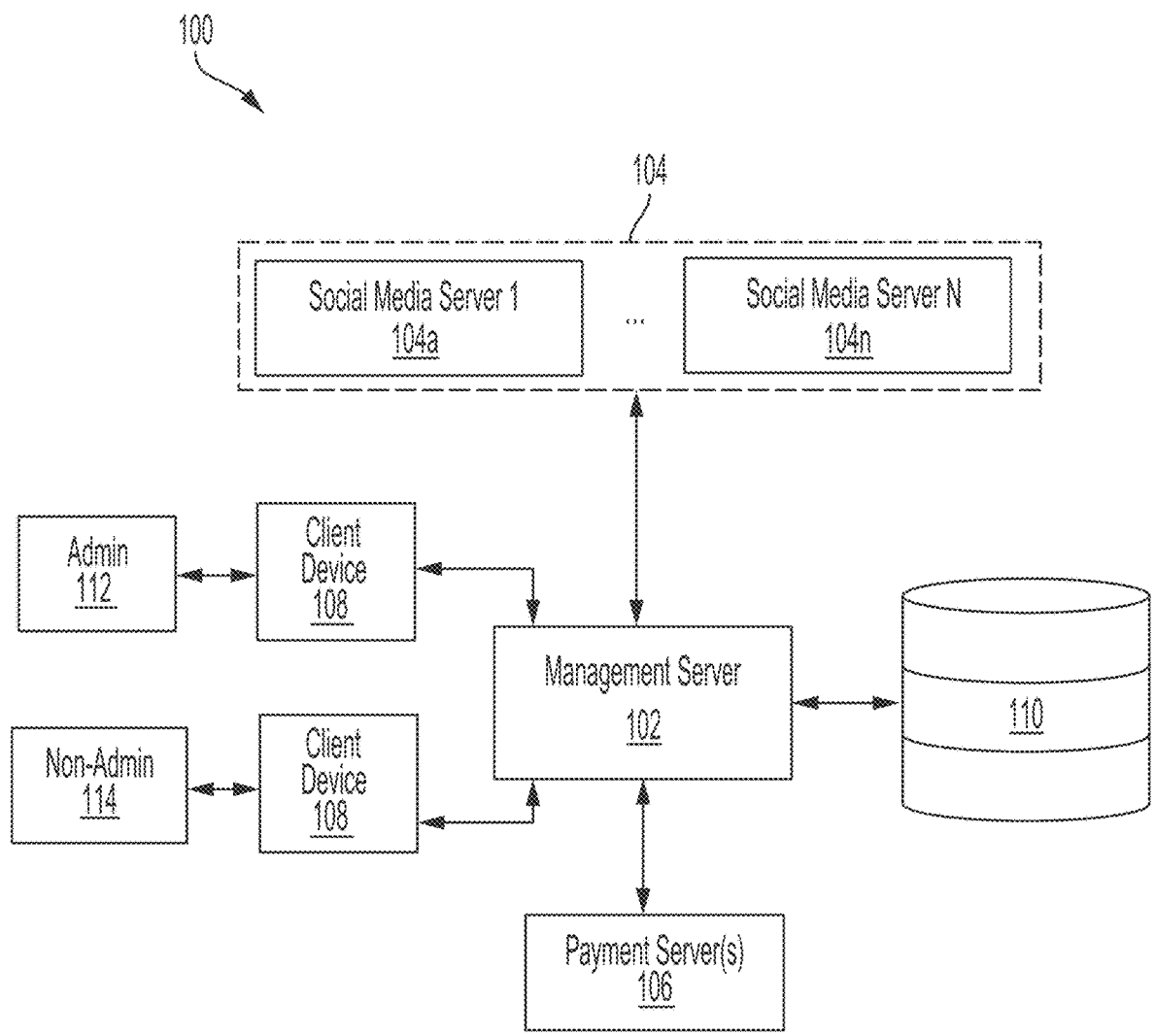
FIG. 1 is a block diagram illustrating an implementation of a system for NIL management in accordance with an exemplary embodiment of the present disclosure.

Numerous details are described herein in order to provide a thorough understanding of the example embodiment illustrated in the accompanying drawings. However, some embodiments may be practiced without any of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

In recent years regulatory bodies governing intercollegiate athletics, such as the National Collegiate Athletic Association (NCAA), have removed the restrictions on college athletes from monetizing their name, image and likeness (NIL). As such, college athletes are able to earn and accept monetary compensation for services such, as activities (e.g., NIL activities) including, but not limited to, endorsements, appearances, social media posts, writing books, hosting camps, teaching lessons in their respective athletic field, and performing various other commercial activities outside of their respective school. As such, embodiments of the present disclosure provide a system and method for automatically determining fulfillment of NIL activities and disbursing payments to student athletes for such NIL activities. Additionally, there are numerous regulations, rules, and laws such as, but not limited to, federal laws, state laws, regulations set by the NCAA and/or school specific regulations that must be taken into account when providing monetary compensation to college athletes. Some regulations, rules, and/or laws may include providing monetary compensation that is commensurate with a student athletes fair market value. As such, embodiments of the present disclosure provides a system and method for automatically determining a fair market value for student athletes and determining payouts for NIL activities commensurate with the determined fair market value while abiding by the various regulations, rules and laws mentioned previously. In this manner, embodiments of the system and methods discussed herein may provide significant improvements to the monitoring and monetary compensation of student athletes engaging in NIL activities.

Some embodiments of the present invention provide a system for automatically determining fulfillment of services (e.g., NIL activities) performed by one or more first parties or entities that have entered into a service agreement (e.g., a contract) with one or more second parties or entities to perform such activities for compensation. In an exemplary embodiment of the present invention the one or more first parties, which perform the services, may refer to student athletes. However, it will be understood that the one or more first parties may be any other type of individual or organization. A "student athlete" may refer to a full-time or part-time student of a high school, university, college, or any other institute of education who also participates in an organized and competitive athletic program offered by the school, university, college, or institute of education. Services such as NIL activities may refer to activities performed by the student athlete that include the deployment of their identity and association in commerce. For example, NIL activities may include social media posts or in person appearances performed by the student athlete. For sake of brevity, aspects of the present invention relating to services performed by a first party (e.g., student athlete) will be discussed with referenced to NIL activities, however it will be understood that a NIL activity may generally be referred to as a service herein. Similarly, and for sake of brevity, aspects of the present invention relating to service agreements will be discussed with reference to contracts between a first party and a second party, however it will be understood that a contract may generally be referred to as a service agreement herein.

The student athletes may enter into service agreements (e.g., contracts) to perform services (e.g., NIL activities) for one or more second parties, such as, but not limited to, charitable organizations, corporations, limited liability companies, partnerships, sole proprietorships, social organizations, or an individual. In exemplary embodiments of the present invention, the one or more second parties may be any of the above listed organizations and will generally be referred to as organizations herein. As such, the student athletes may perform NIL activities in which the student athlete deploys their identity and association with one or more organizations. For example, the student athlete may post, to one or more of their social media accounts, content that is specific to the one or more organizations. Further to this example, the post may be a video or text based message that is specific to, or generally references, an organization to thereby raise awareness for, increase the publicity of, endorse products of and/or generally indicate support for that organization. As mentioned above, NIL activities may further include in person appearances. As such, the in person appearance may be the student athlete appearing at an event hosted by the organization and/or attended by members of the organization, in which the student athletes appearance may generate publicity, awareness and/or support for the organization.

For the sake of brevity, and so as not to obscure pertinent aspects of the invention, the embodiments of the invention will be described with reference to student athletes and organizations. However, it will be understood that aspects of the invention may relate to parties other than student athletes. References are made throughout the disclosure to social media platforms, accounts, usernames, handles, and posts. It will be understood that a social media platform is an internet based interactive technology that enables users to create and/or share digital content and/or to participate in social networking. Social media accounts may refer to any and all accounts, profiles, pages, feeds, registrations and other presences on or in connection with any social media platform. Social media usernames and/or social media handles may be used interchangeably herein and may each refer to a unique public identifier of an individual or organization that owns and/or operates a social media account. Social media posts may refer to digital content generated by a user and published to a social media platform through a user's social media account. Social media posts may include any combination of digital text, audio, video, and/or photos.

The various NL, activities that student athletes are required to perform in order to receive monetary compensation may be outlined by contracts between a student athlete and an organization. A contract may refer to an agreement between different parties (e.g., a student athlete and an organization) that creates, defines, and governs mutual rights and obligations among the parties. For example, a contract between a student athlete and an organization may include that the student athlete agrees to generate two social media posts specific to the organization and that the organization agrees to provide a monetary compensation amount to the student athlete for the two social media posts. As such, embodiments of the present disclosure provide a system and method for associating a plurality of players with a plurality of contracts and automatically determine fulfillment of the student athletes NIL activities in relation to those contracts in order to determine fulfillment of the contractual obligations.

Funding for the monetary payments made to student athletes in response to fulfillment of NIL activities may come from a variety of different sources (e.g., different donors). Furthermore, each source of funding may have different stipulations or requirements for what their funding may be used for, where the funding may be used, and/or to whom the funding may go. For example, a first donor may provide a funding of $10,000 without any stipulations or requirements, a second donor may provide a funding of $30,000 to only be used for student athletes on the basketball team at a specific college or university, and a third donor may provide funding of $50,000 that is intended to only go to a specific student athlete. As such, the system and methods of the present disclosure may be configured to calculate contract payout amounts and/or the total amount of funding available to any one athlete based on a plurality of stipulations and/or requirements set by different donors.

In one embodiment, the system for NIL management, generally designated 100, includes one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, performs one or more or any combination of the methods or steps disclosed herein.

Referring to FIG. 1, there is shown a block diagram illustrating an implementation of a system for NIL management, generally designated 100 and referred to as system 100 for short. While some example features are illustrated, various other features have not been illustrated for the sake of brevity and so as not to obscure pertinent aspects of the example embodiments disclosed herein. To that end, as a non-limiting example, the system for NIL management 100, referred to herein as system 100, may include one or more computing devices in communication with one or more networked servers. The one or more networked servers may share any number of logical units.

In one embodiment, the system 100 comprises a management server 102, one or more social media servers 104, one or more payment servers 106, one or more client devices 108, and one or more databases 110. In one embodiment, the functionality of the management server 102, payment server 106 and/or database 110 is shared by one server or across one or more networked servers. The management server 102 may be one or more computing servers that provide secure access to student athlete specific information, organization specific information, contract specific information, NIL activity information, and/or payment information, one or more of which may be stored on database 110.

The database 110 may have stored thereon data relating to, student athlete specific information, organization specific information, and contract specific information. The student athlete specific information may include, but is not limited to: the name of the student athlete; the sport the student athlete plays; the student athletes position or role within the sport, where applicable; the college or university the student athlete attends; contact information (e.g., email address, phone number); one or more social media account identifiers (e.g., social media account names or handles); banking account information; one or more fair market valuation factors; and a fair market value amount. The organization specific information may include, but is not limited to: the organization name; an organization specific uniform resource locator (URL), alternatively referred to as a web address; and one or more organization specific social media account identifiers (e.g., social media account names or handles). The contract specific information may include, but is not limited to: a listing of the parties involved in the contract (e.g., the name of the student athlete and the name of the organization); the term of the contract (e.g., number of months the contract is valid for); a monetary payout amount; a payout schedule for the monetary payouts; one or more obligations or fulfillment activities required by the contract (e.g., the NIL activities required to be performed by the student athlete); and fulfillment indicators relating to the obligations or fulfillment activities. The management server 102 and database 110 may be in communication such that student athlete information, organization specific information, and/or contract specific information may be transmitted between each.

In some embodiments, the database 110 may have stored thereon data relating to the funding available for monetary payouts to student athletes. As mentioned above, funding may be provided by one or more donors, which may include, but is not limited to, individuals and corporations. The funding provided may be general funding which is not specific to any college, sport, and/or athlete and is therefore available to be used for monetary payment to any student athlete included in the system 100. The funding provided may also be specified funding in which a donor has specified a college, sporting team, and/or student athlete to which the funding may be used for monetary payments. For sake of brevity and so as not to obscure pertinent aspects of the present disclosure, it will be assumed that there is adequate funding for student athletes whose NIL activities are monitored by the system 100. In instances where specified funding applies, the system 100 may be configured to determine payout amounts to student athletes for fulfilling NIL activities based on the student athletes fair market value and the amount of specified funding. For example, if a donor specifies an amount X of funding, that may be lesser than, equal to, or greater than the fair market value of one or more student athletes, for the basketball team at college A, then the system 100 may be configured to adjust payments made to members of the basketball team at college A based on the amount X. In some embodiments, the database 110 may have stored thereon a record of each donation and/or funding amount contributed by donors and which may be used to fund monetary payouts to student athletes. As such, the database 110 may include an indication as to what colleges, sporting teams, and/or athletes the funding may be used for. Following with the previous example, the database may have stored thereon that a donor has funded the amount X exclusively for the basketball team at college A.

In some embodiments, the management server 102 may be configured to transmit to an client device 108 an administrator facing user interface ("UI") that allows users (e.g., administrators 112) to input student athlete specific information, automatically calculate a student athlete's fair market value, generate associations between student athletes and one or more charities and/or contracts, monitor NIL activities specific to contractual obligations, input NIL activities in association with contractual obligations, transmit electronic messages to student athletes regarding contractual obligations, and/or automatically generate payouts associated with contractually obligated NIL activities. In some embodiments, information and/or data input at the administrator facing UI may be transmitted to the database 110 for storage. Administrators 112, as references herein, may be users that have permission to approve or disapprove fulfillment of NIL activities performed by student athletes at the management server.

In some embodiments, the management server 102 may be configured to transmit to an client device 108 a non-administrator facing UI that allows users (e.g., non-administrators 114) to input student athlete specific information, monitor contractual obligations and input NIL activities in association with those contractual obligations. In some embodiments, information and/or data input at the non-administrator facing UI may be transmitted to the database 110 for storage. Non-administrators 114, as referenced herein, may refer to student athletes or any other entity that does not have permission to approve or disapprove fulfillment of NIL activities performed by student athletes at the management server. Each of the user interfaces generated by the management server 102 are discussed in further detail with reference to FIGS. 2A-6.

In some embodiments, the management server 102 may be configured to generate a fair market valuation of a student athlete. For example, the management server 102 may receive data relating to student athlete specific information from the database 110 and may determine, based on the received student athlete specific information, a fair market value of the student athlete with regards to the student athletes ability to leverage their NIL in commercial applications. In some embodiments, the management server 102 may generate the fair market value of a student athlete based on a weighted sum of various factors included in the student athlete specific information. For example, the management server 102 may generate the fair market value based on a weighted sum of any number of fair market valuation factors discussed in more detail below with regards to FIG. 2G.

Still referring to FIG. 1, the management server 102 may be in communication with one or more social media servers 104 such that the management server 102 may automatically pull data from the social media servers 104 relating to NIL activities performed by student athletes. For example, the management server 102 may be configured to perform web-scraping on one or more websites hosted by a social media server 104 to generate a list of social media posts generated by one or more student athletes. In some embodiments, the management server 102 may leverage an application programming interface (API) to facilitate communication between the management server 102 and one or more social media servers 104. For example, the management server 102 may transmit to a social media server 104*a*, via an API specific to social media server 104*a*, a request for information relating to one or more social media posts specific to a student athlete and may receive from the social media server 104*a* the requested information. There may be any number of social media servers 104 in communication with the management server 102. For example, there may be between one to n social media servers 104 in communication with the management server 102 where n is a number greater than one.

In some embodiments, the system 100 may be configured to determine that contractual obligations have been performed by a student athlete and cause the dispensing of a monetary payment to the student athlete. For example, the management server 102 may be configured to determine that a student athlete has fulfilled all contractual obligations required to receive a monetary payment. The contractual obligations may be specific to an individual contract between the student athlete and an organization that has corresponding contract specific information and/or data stored on the database 110. In some embodiments, the contractual obligations may include NIL activities such as, but not limited to, social media posts meeting a predetermined criteria and/or in person appearances verified by one or more parties. In response to the management server 102 determining that all contractual obligations have been fulfilled, the management server 102 may transmit a request to a payment server 106 to disburse an amount of money, defined by the contract, to the student athlete. In response to receiving the request to disburse payment from the management server 102, the payment server 106 may transfer funds to a banking account associated with the student athlete. In other embodiments, the functionality of the payment server 106 may be integrated into the management server 102.

Figure 2A:
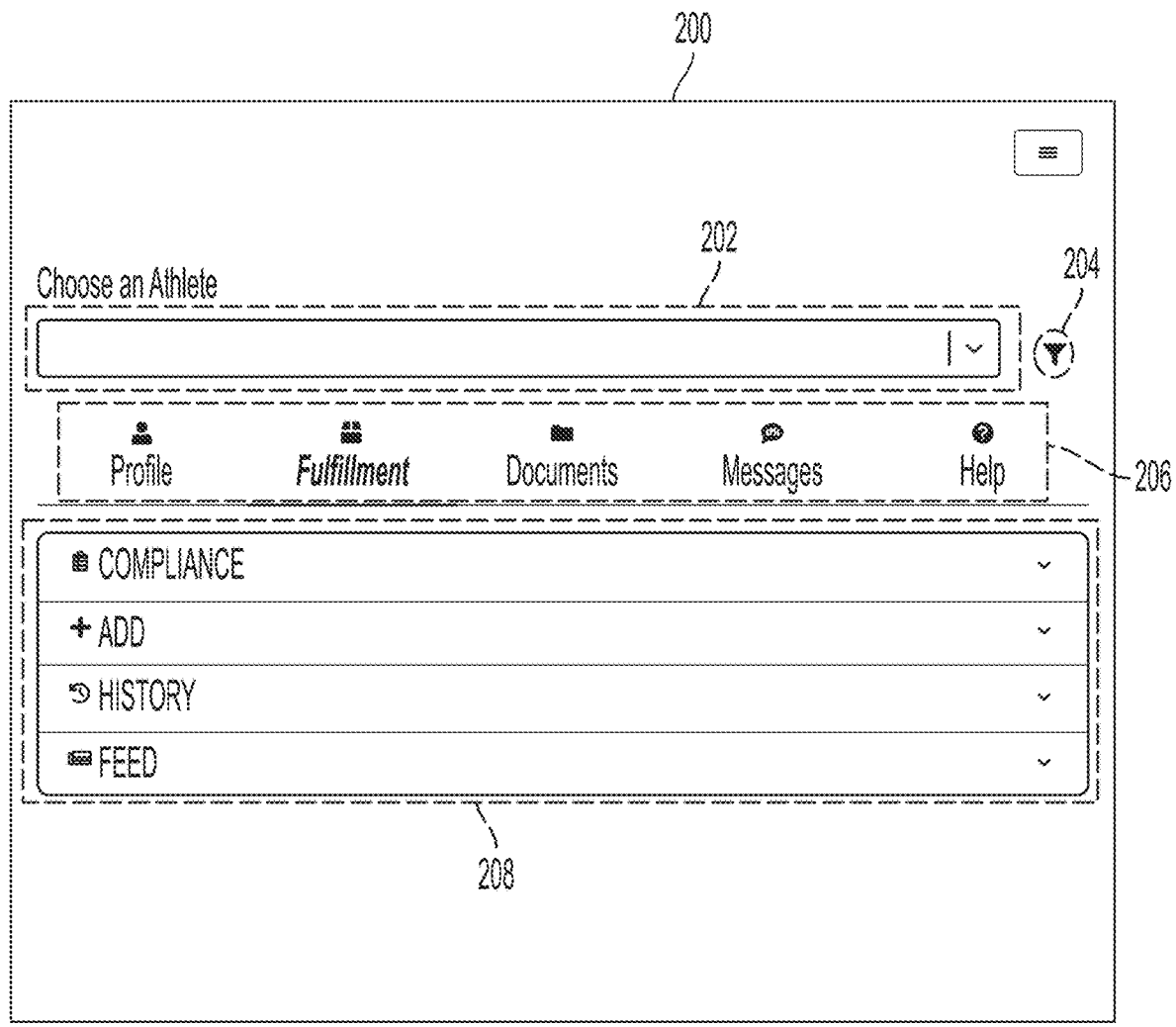
FIGS. 2A-2O illustrate exemplary user interfaces generated by the management server associated with a method of onboarding a first party into the system for NIL management.

Referring to FIGS. 2A-2O, there is shown exemplary user interfaces generated by the management server 102 and displayed on an client device 108. The exemplary user interfaces shown in FIGS. 2A-2O may be associated with a method of integrating student athlete specific information into the system 100 according to embodiments of the present disclosure. In some embodiments, a user may navigate to a URL via a web-browser or access via a smartphone software application the UIs illustrated in FIGS. 2A-2O. The user-interfaces (UIs) illustrated in FIGS. 2A-2O are displayed on a web-browser of a desktop or laptop computer, however, it will be understood though that the UIs may be displayed on any other computing device (e.g., a smartphone, a tablet). In some embodiments, a user may be presented with a login screen in which the user must input credentials specific to the management server 102 in order to access the UIs shown in FIGS. 2A-2O.

In some embodiments, the user may input their user specific credentials and transmit them to the management server 102. The management server 102 may verify that the user credentials are correct and in response to the user credentials being correct may transmit to the client device 108 the user interface 200 shown in FIG. 2A for display to the user. In some embodiments, the management server 102 may be configured to transmit to the client device 108, an administrator user interface 200 or a non-administrator user interface 300 (shown for example in FIG. 2N). For example, the database 110 may have stored thereon, management server user specific account information indicating whether a user is an administrator or a non-administrator. The management server 102 may communicate with the database 110 to determine whether a user is an administrator or a non-administrator, based on the input user credentials, and transmit for display the corresponding user interface.

The user interface 200 shown in FIG. 2A includes an athlete selection drop-down menu 202, an interactable filter icon 204, a menu bar 206 including one or more interactable tabs, and an interactable tab display field 208. The athlete selection drop-down menu 202 may be interacted (e.g., clicked on) by a user (e.g., an administrator 112) to display a listing of student athletes already integrated with the management server 102 and/or database 110. For example, the athlete selection drop-down menu 202 may display a listing of all the names of all student athletes having data relating to student athlete specific information that is stored on database 110. A user may select the names of one or more student athletes displayed on menu 202 to display information relating to the student athletes, as described in more detail below. The menu bar 206 may include interactable tabs relating: to student athlete specific information (e.g., a "Profile" tab); fulfillment of contractual obligations (e.g., a "Fulfillment" tab); formal documents relating to contractual obligations and/or monetary payments (e.g., a "Documents" tab); correspondence to and from student athletes and/or organization members (e.g., a "Messages" tab); and/or information relating interacting with the user interfaces 200, 300 (e.g., a "Help" tab). The interactable tab display field 208 may include one or more interactable fields or icons corresponding to the interactable tab selected. For example, as shown in FIG. 2A, the fulfillment tab is currently selected, or active, and the interactable tab display field displays one or more interactable items corresponding to the fulfillment of contractual obligations having information corresponding thereto stored on database 110.

Figure 2B:
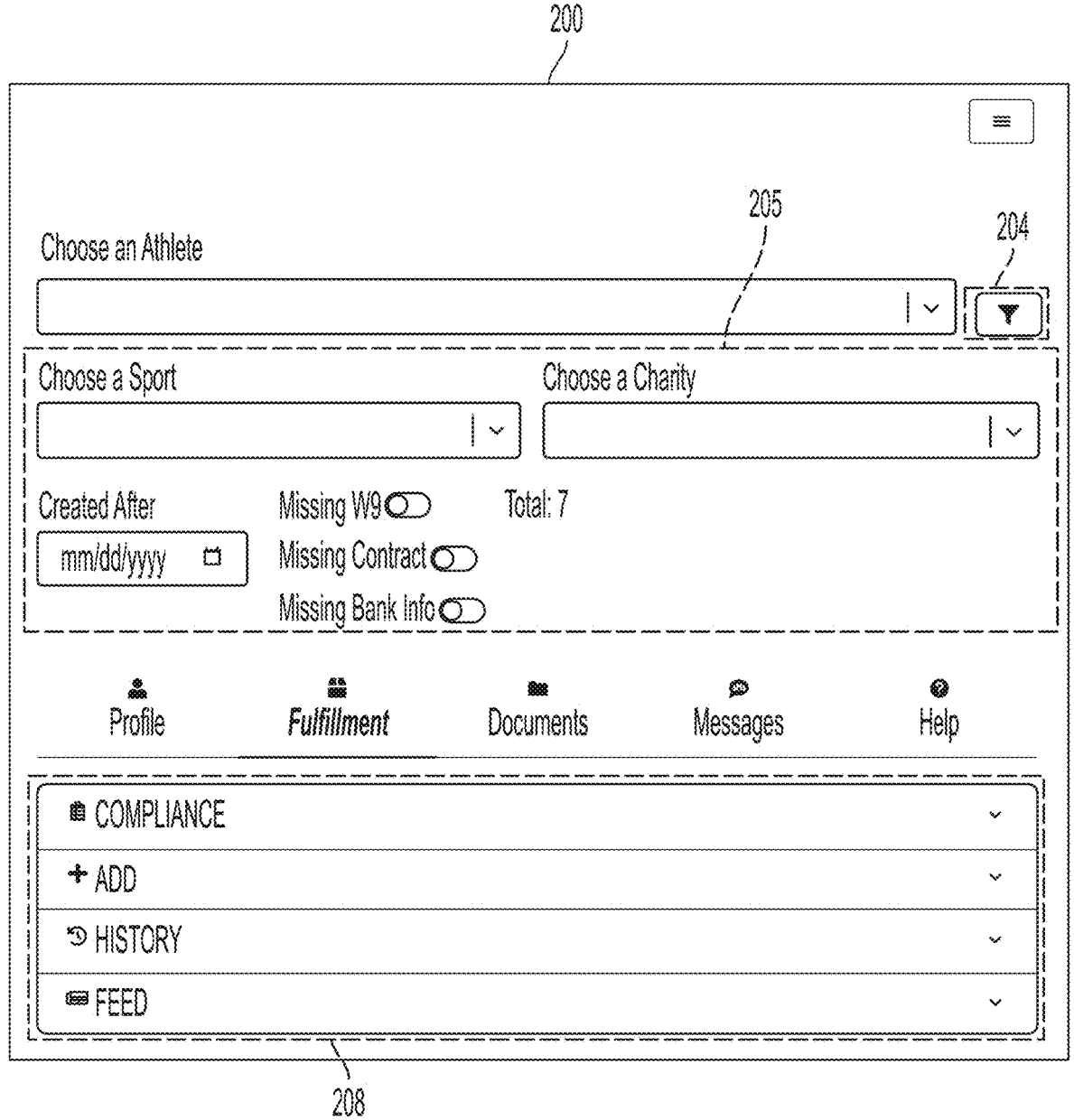

In response to a user selecting the filter icon 204, a filter menu 205, as shown in FIG. 2B may be displayed to the user at the client device 108. The filter menu 205 may allow a user to input commands to filter information displayed on the interactable tab display field 208, as described in more detail below. In some embodiments, the filter menu 205 may enable a user to filter information based on one or more of: a sport, an organization, a date, and whether documents and/or information relating to tax forms (e.g., W9 forms), contract information, and/or banking information are stored on the database 110.

Figure 2C:
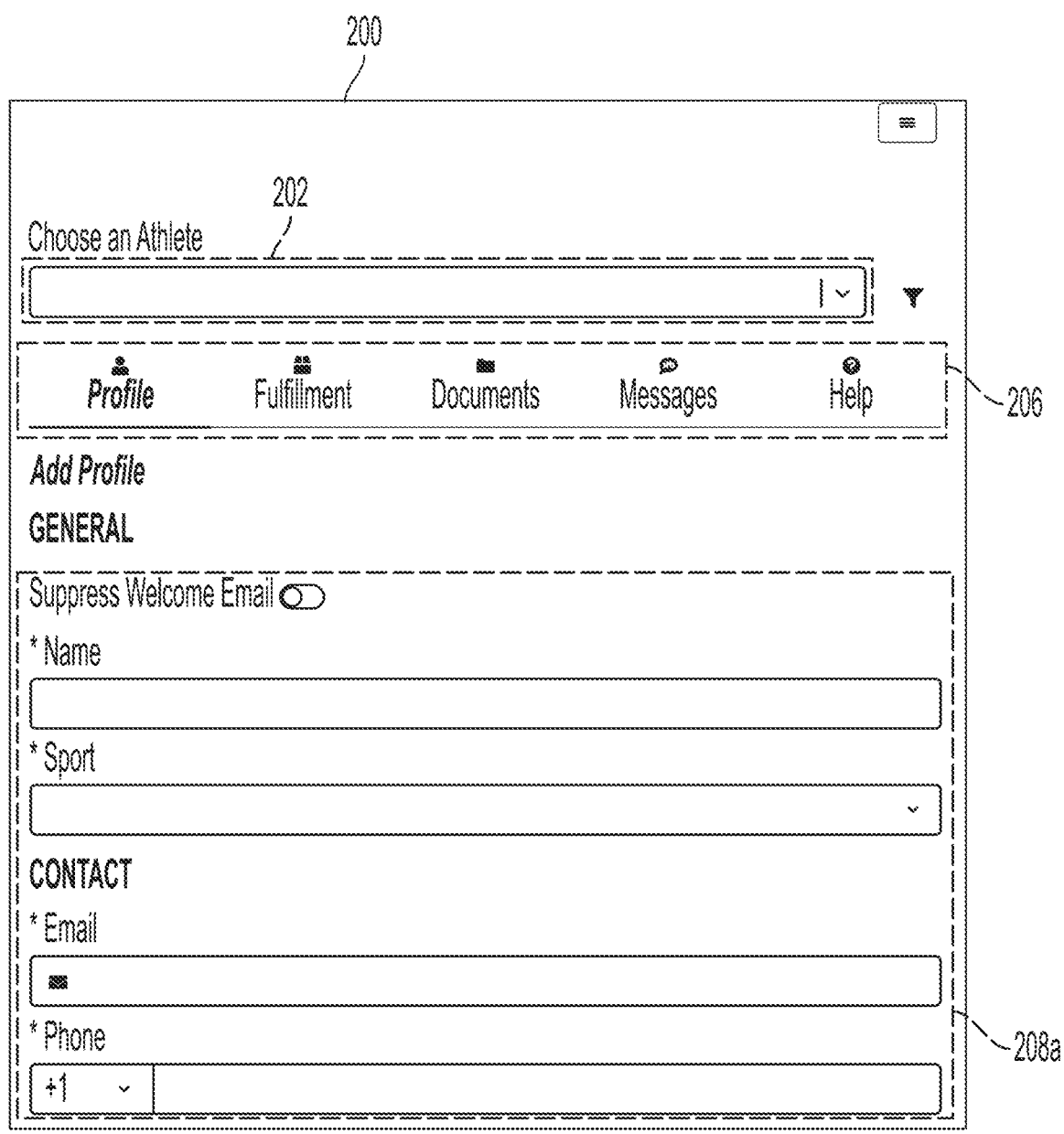

Referring to FIG. 2C, the user may select the profile tab located on the menu bar 206 to display information relating to a specific student athlete, update information relating to a specific student athlete, and/or to input information relating to a specific student athlete having no information stored on database 110. In the user-interfaces illustrated in FIGS. 2C-2J, the user is inputting information relating to a student athlete having no information stored on database 110. Put another way, the exemplary user interfaces shown in FIGS. 2C-2O illustrate a method of onboarding a student athlete into the system 100. It will be understood however, that the same user interfaces may be used to view and/or update existing student athlete information. For example, the user may select a student athlete's name from the athlete selection drop-down menu 202 and the management server 102 may automatically populate the various fields displayed on the user interface with student athlete specific information stored on database 110 corresponding to the user's selection of an athlete's name. The following figures of exemplary user interfaces generated on the management server 102 and displayed on the client device 108 includes a user (e.g., administrator 112, non-administrator 114) inputting information specific to a student athlete, one or more organizations, and one or more contracts at the user interfaces. The management server 102 may be configured to automatically transmit data input by the user at the exemplary user interfaces to the database 110 for storage.

In response to the user selecting the profile tab at the menu bar 206, the management server 102 may transmit for display at a profile tab display field 208a, one or more data fields corresponding to information for a student athlete. In FIG. 2C, the data fields are blank because no student athlete was selected at the athlete selection drop-down menu 202. As such, the user may input data into the blank data fields to begin onboarding a student athlete into the system 100. For example, in FIG. 2D, the user may input data into the data fields relating to student athlete. The data fields may include, but are not limited to the name of the student athlete, an email address of the student athlete, a phone number for the student athlete, and one or more public social media usernames corresponding to the one or more social media servers 104. The one or more public social media usernames may be alternatively referred to as public handles and may be unique identifiers including a combination of text and/or symbols that identify the student athletes corresponding social media account on one or more social media platforms. The specific social media platforms may be social media platforms hosted and/or generated by the social media servers 104a-104n in communication with the management server 102. It will be understood that there may be any number of data fields for a user to input student athlete public social media usernames. In some embodiments, there may be more than one data field for each social media platform to allow a user to input multiple student athlete specific public usernames for a single social media platform. For example, a student athlete may have any number of separate social media accounts on a single social media platform. As such, there may be any number of data fields displayed at the profile tab display field 208a to allow a user to enter each student athlete social media public username specific to a single social media platform. For the sake of brevity though, in the examples provided herein only a single social media public username for a given social media platform is illustrated.

Still referring to FIG. 2D, there may be displayed at the profile tab display field 208a for the profile tab, a sport selection drop-down menu that enables a user (e.g., admin 112) to select a sport to associate the student athlete with. The selected sport may be the organized competitive sport that the student athlete participates in and that is sponsored by the educational institution (e.g., college, university) that the student athlete attends. The sport selections displayed by the drop-down menu may be any type of organized competitive sport sponsored by any educational institution. For the sake of brevity, not every sport that could be included in the displayed selection options will be described or illustrated. Continuing the example of onboarding the student athlete, the user may select a sport (e.g., Football) from the sport selection drop-down menu to associate the student athlete with the selected sport.

Figure 2F:

Referring to FIG. 2F, the user has selected a sport to associate the student athlete with, which in this example is Football, and has proceeded to input banking information specific to the student athlete. For example, there may be displayed on the profile tab display field 208a for the profile tab, one or more data fields relating to banking account information that the user may interact with. In some embodiments, the data fields relating to banking information include, but are not limited to, a bank name data field, a routing number data field and an account number data field. The user (e.g., administrator 112) may input the banking information for the student athlete into the data fields. The banking information input in the data fields displayed on the profile tab display field 208a may be transmitted to the database 110 for use when monetary payments to the student athlete are disbursed.

In FIG. 2F, the banking information specific to a student athlete is being input by an administrator who is not the student athlete, however in some embodiments, banking information specific to a student athlete may be hidden from any user who is not the student athlete. For example, banking information specific to a student athlete may only be displayed to the student athlete. A student athlete may access the management server via a student athlete facing user interface 300 by inputting credentials (e.g., username, password) specific to them. On the student athlete facing user interface 300, described in more detail below, they may be able to view, edit, and/or input their banking information. In such embodiments, where student athlete banking information is hidden from all other users, the administrator facing user interface 200 may instead include an indication as to whether banking information exists for the student athlete in the database 110.

Referring to FIG. 2G, the user has finished inputting banking information for the student athlete and begins inputting one or more fair market valuation factors specific to the student athlete such that the management server 102 may determine a fair market value for the student athlete. In some embodiments, the profile tab display field 208a may include one or more input fields relating to one or more types of fair market valuation factors to enable a user to input information for those factors. In some embodiments, the input fields may include one or more input sport specific factor input fields 210a, one or more value based factor input fields 210b, and one or more boolean factor input fields 210c. The fair market valuation factors discussed herein are for illustrative purposes only and it will be understood that any number or combination of factors may be used to determine a fair market value specific to the student athlete.

The sport specific input fields 210a may relate to market valuation factors specific to the student athlete and specific to the sport the student athlete is a member of at their college or university. In some embodiments, the one or more sport specific factor input fields 210a may include an indication as to the specific role that the student athlete takes on the field when playing their respective sport, generally referred to as the student athletes "position". The user may be able to input, via sport specific factor field 210a displayed on the profile tab display field 208a associated with the profile tab, the position of the student athlete within their respective sport. In some embodiments, the sport specific factor fields includes a position drop-down menu that may be automatically populated with a listing of positions specific to the sport selected by the user. For example, the selected sport is football and the drop-down menu may display positions such as, but not limited to, quarterback (QB), center (C), cornerback (CB), offensive guard (OG), offensive tackle (OT), running back (HB/FB), wide receiver (WR), tight end (TE), defensive tackle (DT), defensive end (DE), middle linebacker (MLB), outside linebacker (OLB), safety (S), kicker (K), and/or any other position included in American football. In instances where the sport does not include any specific positions (e.g., golf) the position selection drop-down menu may be inactive such that a user is prevented from inputting any data. In FIG. 2E, the selected position is a cornerback (CB). Although a single sport specific input field 210a is illustrated in FIG. 2G, it will be understood that there may be any number of sport specific input fields displayed to the user at the profile tab display field 208a.

The value based factor input fields 210b may relate to fair market valuation factors that can be quantified or estimated within a predefined range consisting of more than two values or fair market valuation factors that may include any specific number value. For example, the value based factor input fields 210b illustrated in FIG. 2G include three value based factor fields quantified within a predetermined range (e.g., factors 1-3) and a single value based factor that could be any specific number (e.g., number of social media followers). In some embodiments, the profile tab display field 208a displayed on the client device 108 may enable the user (e.g., administrator 112) to input one or more values at the value-based factor input fields 210b. For example, in FIG. 2G the value-based factor input fields 210b displays to the administrator 112 via client device 108 three separate interactable fields where the administrator 112 may input values for three different fair market valuation factors (e.g., factors 1-3) within a predetermined range. The three fair market valuation factors may be any combination of: a composite rating value (e.g., a star rating value), age of the student athlete, number of injuries the student athlete has experienced, a ranking of the student athletes talent and/or skill within their respective sport, a ranking of the student athletes historical performance data for their respective sport, the student athlete's height and/or weight, the student athletes grade point average, the number of years the student athlete has attended their respective college or university, or alternatively the number of years remaining at the college or university, number of collegiate and/or non-collegiate sporting events the student athlete has participated in, a rating of the student athletes behavior, attitude, and/or character as an individual, a rating of the student athlete's involvement in extracurricular activities, a value indicating the level of impact the student athlete has had on the sporting program at their current college and/or university and/or a level of impact the student athlete has had on a community to which they belong, and/or any other fair market valuation factor quantifiable within a predetermined range.

It will be understood that the above listing of value based fair market valuation factors is intended as a non-exhaustive listing and that other value-based factors may be included. Although three value based fair market valuation factor fields 210b are illustrated in FIG. 2G, it will be understood that any number of other fair market valuation factor fields 210b may be displayed at the profile tab display field 208a to enable an administrator 112 to input values within a predetermined range. For example, there may be between one to twenty value-based factor fields 210b displayed at the profile tab display field 208a to enable an administrator to input said values. In some embodiments, the management server 102 may be configured to prevent student athletes from inputting values for their own, or other student athletes, fair market valuation factors. In the example shown in FIG. 2G, the values input by the administrator for the three value based fair market valuation factors is seven, fifty, and zero. As such, it will be understood that different rating scales and/or ranges of values may be used for different value-based factors. For example, the first factor may be any value between zero and ten, the second factor may be any value between zero and one hundred, and the third factor may be any value between zero and fifty.

In some embodiments, one or more of the value-based fair market valuation factor fields 210b may relate to a number of social media followers a student athlete has specific to one or more social media platforms. The value based fair market valuation fields 210b may include one or more interactable fields to allow a user (e.g., an administrator 112) to input a specific value relating to the number of social media followers for one or more of the student athletes social media specific accounts. For example, if the student athlete has X number of social media followers on a first social media platform, the administrator may input a value of X at the social media followers field. In the example illustrated in FIG. 2G, the student athlete has 70,000 followers on a first social media platform, and as such, the administrator inputs a value of 70,000. In some embodiments, the management server 102 may be configured to automatically determine the number of social media followers. For example, the management server 102 may perform web scraping or interact with a social media platform server via an API to determine a number of social media followers specific to the student athletes social media public username and may automatically populate the social media followers field displayed on the profile tab display field 208a with the determined number of social media followers. In some embodiments, there may be a number of social media follower fields displayed on the profile tab display field 208a equal to the number of different social media platform accounts the student athlete has. For example, if the student athlete has a first social media account for a first social media platform and a second social media account for a second social media platform, the profile tab display field 208a may display two social media follower fields where values for the number of social media followers specific to each social media platform may be input and/or automatically determined.

The boolean market valuation factor fields 210c may relate to fair market valuation factors where only a true or false statement is applicable. For example, the tab display field 208 may include one or more boolean factor fields to allow the user to select either a true or false value relating to one or more boolean fair market valuation factors. Some examples of boolean fair market valuation factors displayed at the profile tab display field 208a may include, but are not limited to: whether the student athlete is perceived as or acts as a leader on their respective sports team, whether the student athlete is a starting player on their respective sports team, whether the student athlete is currently injured, and/or whether the student athlete is on academic probation. Although a single boolean market valuation factor field 210c is displayed at the profile tab display field 208a, it will be understood that any number of boolean market valuation factor fields 210c relating to any number of boolean market valuation factors may be displayed at the profile tab display field 208a. In some embodiments, one or more non-numerical value factors may be automatically converted to a numerical value by the management server 102 for purposes of calculating the fair market value for the student athlete. One or more of the values input to the boolean market valuation factor fields 210c and/or any of the inputs at the sport specific input fields may be converted to a numerical value by the management server 102. For example, an input of QB (e.g., quarterback) at a sport specific input field may be converted by the management server 102 to a value of X whereas an input of RB (e.g., running back) may be converted to a value of Y that is different from X and where both X and Y are numerical values. In this manner, any non-numerical market valuation factors may be automatically converted to a numerical value to be included in a calculation of the fair market value (e.g., included in a weighted sum).

Still referring to FIG. 2G, the user may input, at the profile tab display field 208a a value for the contract months associated with the student athlete. The contract months may generally refer to a period of time in which payments may be made to a student athlete. In FIG. 2G, the contract months value is twelve, which indicates that payments may be made to a student athlete over a period of twelve months from either the date that the student athlete information was entered into and/or updated in system 100.

Referring to FIG. 2H, in some embodiments, the user (e.g., administrator) may input a command at the profile tab display field 208a indicating that the user wishes to calculate a market value for the student athlete based on one or more of the fair market valuation factors previously input and based on the period of time specified by the contract months. For example, the administrator may select the "Calculate" button on the profile tab display field 208a. In response to the user input at the "Calculate" button, the management server 102 may be configured to determine a fair market value for the student athlete based on one or more of the fair market valuation factors and the number of contract months input by the user. The management server 102 may determine the fair market value by performing a weighted sum of one or more of the fair market valuation factors input by the user. For example, the management server 102 may perform a weighted sum calculation based on the information input into one or more of the sport specific market valuation factor field(s) 210a, the value based market valuation factor fields 210b, and the boolean market valuation factor fields 210c. The management server 102, may determine a fair market value to display at a market value display field 212, based on the performed weighted sum calculation and the number of contract months input by the user.

The amount displayed to the user at the market value display field 212 may be an indication as to the total monetary amount a student athlete may earn within the specified number of contract months. For example, in FIG. 2H, the specified number of contract months is twelve and the market value display field 212 displays to the user a monetary amount of $10,164. As such, the maximum amount of monetary payment that may be disbursed to the student athlete within the twelve month contract period may be $10,164. If the number of contract months were updated to be six months, instead of twelve, the value displayed at the market value display field 212 may be $5,082. Put another way, if the number of contract months is halved, the market value may be halved as well.

In some embodiments, the amount displayed at the market value display field 212 is also based on a minimum, or average, expected number of NIL activities performed by the student athlete within the number of contract months. For example, and as mentioned above, the student athletes must complete some form of NIL activity, as outlined in one or more contracts, in order to receive any monetary payment. As such, the value displayed at the market value display field 212 may be at least partially based on a number of expected NIL activities to be performed. In this manner, the market value display field 212 may display to the user (e.g., administrator 112) an estimate of the student athletes market value within the period of time defined by the contract months. The number of minimum, or average, NIL activities expected to be performed by a user may be a value set by an administrator 112 and may be stored in database 110.

Referring to FIG. 2I, in some embodiments, the fair market value for a student athlete determined by the management server 102 may be further based on a fixed amount of funding available to that student athlete. As such, the management server 102 may be configured to enable a user to input a fixed monetary amount associated with a specified donation to which the student athlete qualifies for. For example, a user (e.g., an administrator) may input a monetary value amount at a fixed amount input field 210d displayed at the profile tab display field 208a. As mentioned above, funding for the monetary payments to student athletes may be provided by donors who may specify which college, sporting teams, and/or student athletes the funding may be used for. As such, the administrator 112 may input an amount equal to or lesser than the amount of funding specified by one or more donors at the fixed amount input field 210d. In some embodiments, the management server 102 may be configured to automatically determine and display the fixed amount at the fixed amount input field 210d. For example, the management server 102 may automatically determine, based on one or more of the name of the student athlete, the college the student athlete attends, the sporting team the student athlete is a member of, and/or the position of the athlete within the sporting team, the fixed amount and may cause the fixed amount input field 210d to display that amount. In the example shown in FIG. 2I, the fixed amount is $200,000, which corresponds to a monetary value donated by a donor that specifies that they wish for a specific student athlete to receive a fixed amount of $200,000.

In response to a fixed amount being input at the fixed amount input field 210d the administrator may click the "Calculate" button to calculate the fair market value for the student athlete. Calculating the fair market value for the student athlete may be generally the same as described above with reference to FIG. 2H except that the calculation performed by the management server is also based on the value input at the fixed amount input field 210d. As such, the calculated fair market value is different from what is displayed in FIG. 2H. For example, in FIG. 2H the fair market value is $10,164 when the fixed amount input field 210d is empty and the fair market value is $83,291 when the fixed amount input field 210d is $200,000. As illustrated, the fair market value displayed at the market value display field 212 is less than the value displayed at the fixed amount input field 210d. This may provide an indication to the user (e.g., administrator 112) that in order for the student athlete to achieve a monetary payout totaling the amount (e.g., $200,000) input at the fixed amount input field 210d over the course of the specified contract months (e.g., twelve months) the student athlete will be required to perform an amount of NIL activities that is greater than the minimum or average number of expected NIL activities discussed above with regards to FIG. 2H.

In some embodiments, the management server 102 may be configured to display to the user (e.g., administrator) a number of NIL activities required to be performed by a student athlete in order to achieve the value input at the fixed amount input field 210d. For example, and still referring to FIG. 2G, an administrator may click the "Calculate" button after inputting the value at the fixed amount input field 210d. In response to the user clicking the "Calculate" button, the management server 102 may perform a weighted sum calculation of the factors input at the market valuation factor fields 210a, 210b, and 210c and determine a market value for the student athlete based on the weighted sum calculation, the specified number of contract months, and a minimum or average expected number of NIL activities. Furthermore, the management server 102 may determine, based on a difference between the determined market value (e.g., $83,291) and fixed amount value (e.g., $200,000) that X number of additional NIL activities must be fulfilled by the student athlete to achieve the fixed amount value. As such, the management server 102 may cause the tab display field 208 to display an indication of the number X of additional NIL activities required to be fulfilled by the student athlete. For example, if the fixed amount value is twice determined market value and the minimum or average expected number of NIL activities is equal to Y then the number X of additional NIL activities required to be fulfilled may be equal to Y. As such, the student athlete would be required to fulfill 2Y number of NIL activities in order to achieve a total monetary payment over the period of time defined by the specified number of contract months (e.g., twelve months).

Figure 2J:
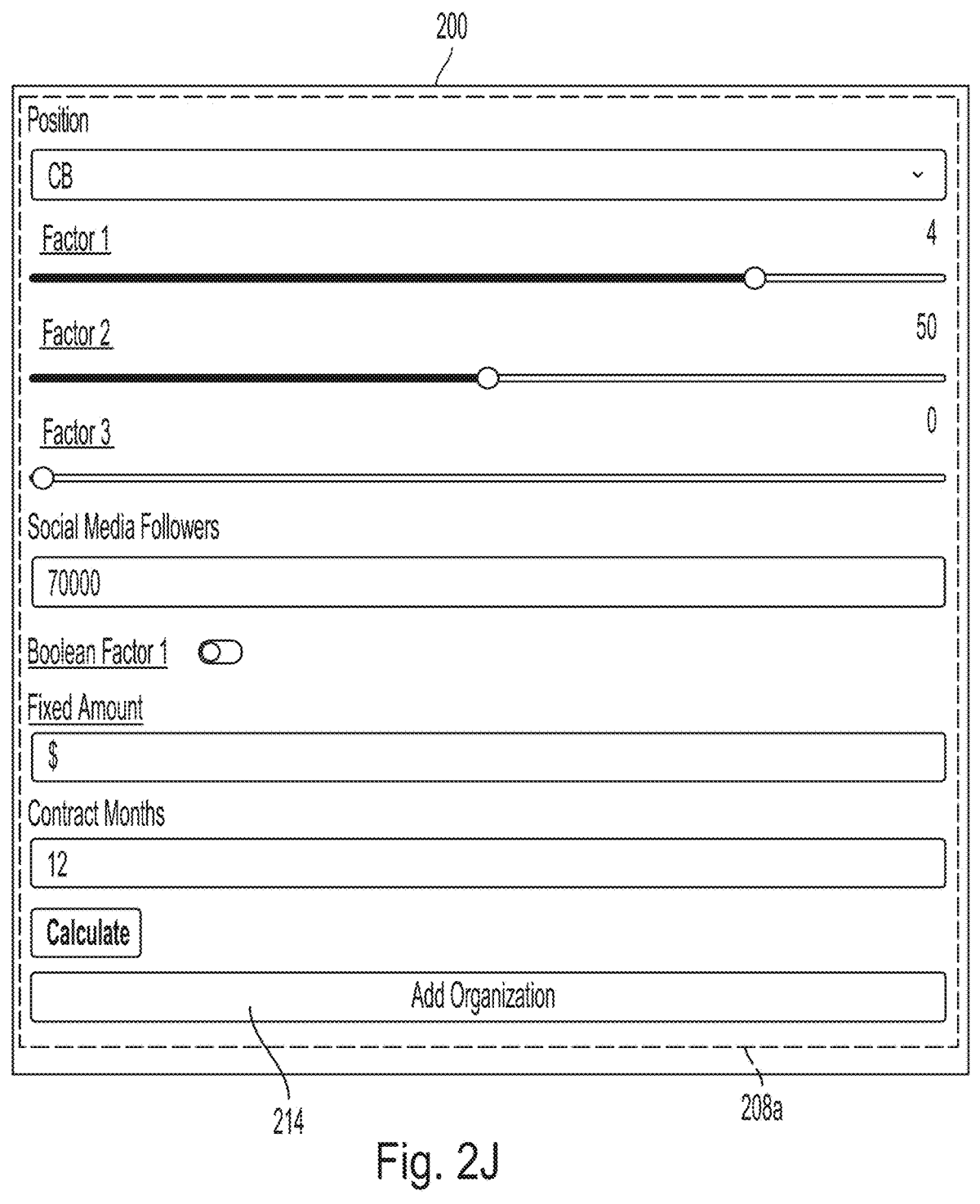

Referring to FIG. 2J, the management server 102 may be configured to enable a user (e.g., administrator) to associate a student athlete with one or more organizations that may establish a contract with the student athlete to fulfill predetermined NIL activities in return for a monetary payment. As mentioned above, the organization may be a charitable organization, or charity for short, corporations, limited liability companies, partnerships, sole proprietorships, social organizations, or an individual. One or more organizations may have organization specific data, described in more detail below, that is stored on the database 110. For example, organization specific data for a plurality of organizations may be stored on the database 110 prior to the user beginning onboarding of the student athlete (e.g., starting at FIG. 2C). The user may interact with an "add organization" button 214 displayed at the profile tab display field 208a displayed to begin associating the student athlete with an organization.

Figure 2K:
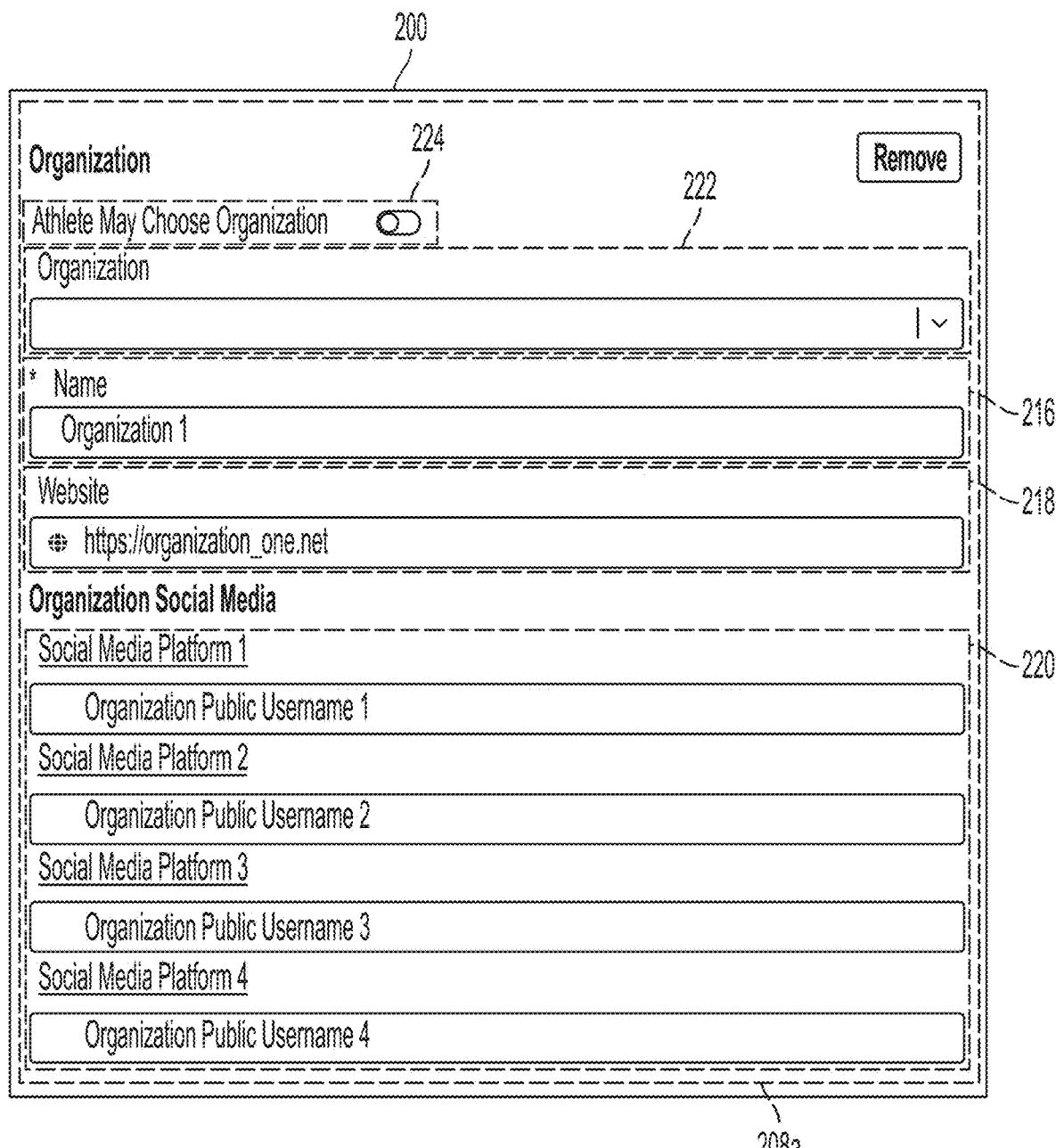

Referring to FIG. 2K, in response to the user selecting the "add organization" button 214, the profile tab display field 208a may display to the user one or more organization specific data fields where the user (e.g., administrator 112) may input, retrieve, and/or update organization specific information. The organization specific data fields may include an organization name input field 216, an organization web address input field 218, and one or more organization social media handle input fields 220. In some embodiments, the organization specific data fields further includes one or more category input fields (not shown) to enable a user to input information relating to one or more categories that apply to an organization. For example, the one or more category fields may enable the user to input the organizational structure of the organization (e.g., charity, LLC, sole proprietorship). In some embodiments, the administrator 112 may manually input data into one or more of the input fields 216, 218, 220 and/or cause the management server 102 to automatically fill information associated with a selected organization. For example, the profile tab display field 208a may include an organization selection drop-down menu 222 that may display to the user one or more organizations having associated organization specific information stored on database 110. For example, there may be a plurality of organizations (e.g., organizations a through organization n) each having organization specific data stored on database 110. the organization selection drop-down menu 222 may display to the user each of the organizations by name such that the user may select one of the organizations displayed. In response to a user selecting an organization at the organization drop-down menu 222, the management server 102 may automatically retrieve organization specific information for the selected organization from the database 110 and display that information at the corresponding input fields 216, 218, 220.

It will also be understood that a user may populate the input fields 216, 218, and/or 220 with existing organization specific information and may update or change the information displayed at the corresponding input fields thereby causing the corresponding information to be updated or changed in database 110. For example, if organization a has a web address of "https://organizationa.com" and the user populates the input fields by selecting organization a from the organization drop-down menu 222, the user may then update the web address at the web address input field 218 to read "https://theorganization_a.com". In response to the user updating the organization web address for organization a, the management server 102 may transmit an indication of the change to the database 110 such that the web address data for organization a stored on database 110 is "https://theorganization_a.com". In some embodiments, the profile tab display field 208a may include an interactable button 224 relating to whether a student athlete is enabled by system 100 to select an organization. For example, if the interactable button 224 is set to TRUE by an administrator 112, the student athlete may be enabled, by the management server 102, to select an organization (e.g., charity) for which they wish to establish a contract. If the interactable button 224 is set to FALSE (as shown in FIG. 2K) by an administrator 112, the management server 102 may be configured to prevent the student athlete from selecting an organization for which they wish to establish a contract.

In the example illustrated in FIG. 2K, the user (e.g., administrator 112) manually inputs organization specific information into the input fields 216, 218, 220 corresponding to an organization that did not previously have organization specific information stored on database 110. Put another way, the user inputs organization specific information for an organization that was not previously associated with any other student athlete and/or contract included in the system 100. As such, the management server 102 may be configured to transmit the organization specific information to the database 110 and the database may store the organization specific information. The information input by the administrator 112 for the organization may include the name of the organization (e.g., "organization 1"), a web address associated with the organization (e.g., "https://organization_one.net") and one or more social media usernames and/or handles associated with the organization. Each organization specific social media handle may correspond to a respective social media account owned and/or operated by the organization on a respective social media platform. The organization specific social media handles may be used by the system 100 when automatically determining fulfillment of NIL activities performed by the student athlete in relation to the organization, as discussed in further detail below.

Referring to FIG. 2L, the management server 102 may be configured to allow a user to create contract specific information relating to a contract between a student athlete and an organization. For example, the profile tab display field 208 may display to the administrator 112 one or more contract specific information input fields to allow the administrator 112 to input contract specific information to be stored on the database 110. The management server 102 may be configured to automatically associate the contract information input by the administrator 112 with the organization input, or selected, by the administrator 112 in the previous figure. For example, in the previous figure (FIG. 2K), the administrator 112 input organization specific information relating to "Organization 1" and as such, the management server 102 automatically associates the contract specific information with "Organization 1" and the student athlete whose information was input by the administrator 112 in FIGS. 2C-2J.

In some embodiments, the contract specific data input fields displayed on the tab display field 208a include a contract start date input field 226, a contract amount input field 228, and a payout schedule selection field 230. The administrator 112 may input data relating to a date that the contract will begin at the contract start date input field 226, which in this example is Sep. 22, 2022. The administrator 112 may input data relating to a total monetary amount associated with the contract at the contract amount input field 228, which in this example is $25,000. The administrator 112 may input data relating to a payout schedule associated with the contract at the payout schedule input field 230, which in this example is selected as "standard" payout schedule. The payout schedules may generally be a set of rules defining how the monetary amount input at the contract amount input field 228 will be disbursed to a student athlete upon fulfillment of NIL activities included in the contract. A payout schedule may define payment intervals (e.g., how often monetary payments are made or how many payments will be made), and what percentage of the total monetary amount input at the contract amount input field 228 is disbursed in a single payment. For example, a payout schedule may define that the total contract amount (e.g., $25,000) will be paid in ten intervals each being one month apart from each other and each being for an amount equal to 10% of the total contract amount (e.g., $2,500). The system 100 may be configured to enable an administrator 112 to define new payout schedules and/or update existing ones and is described in more detail below.

In some embodiments, the management server 102 may be configured to automatically determine a type of and/or number of NIL activities to be performed by the student athlete in accordance with one or more contracts associated with the student athlete. The management server 102 may automatically determine a type and/or number of NIL activities to be performed by the student athlete in response to a contract specific information being stored in the database 110 that includes an indication of the student athlete and organization that the contract is established between. In some embodiments, the management server 102 may automatically determine the type and/or number of NIL activities to be performed by the student athlete based on one or more of the organization with which the student athlete has formed a contract, the total monetary payout amount of the contract, and/or the student athletes fair market value as determined by the management server. For example, in one instance a first organization may require a student athlete to perform four NIL activities for every $5000 of monetary payout included in a contract between the student athlete and the first organization. As such, the management server 102 may determine the total number of NIL activities is eight if the total monetary payout amount is $10,000, and so on. The database 110 may have stored thereon, organization specific data relating to any requirements for monetary payments in relation to NIL activities (e.g., such as previously described and/or as described below).

In another instance, the management server 102 may determine the total number of NIL activities to be performed based on the total payout amount defined by the contract and the student athletes determined fair market value. For example, if the student athletes determined fair market value is X, the management server 102 may calculate a value associated with the student athlete performing a single NIL activity that is a function of X (e.g., a student athlete specific NIL activity value). Put another way, the management server 102 may be configured to determine the value associated with a student athlete performing a single NIL activity based on that student athletes fair market value. As such, the management server 102 may divide the total payout amount defined by the contract by the student athlete specific NIL activity value to determine how many NIL activities are required to be performed by the student athlete in order to fulfill the contractual obligations outlined in the contract and receive the total monetary payout. In some embodiments, the management server 102 may be configured to round up or down when the determined number of NIL activities is not a whole number.

In some embodiments, the management server 102 may be configured to determine that a determined number of NIL activities is below a predetermined minimum amount and automatically adjust the number of NIL activities to be equal to the predetermined minimum amount. For example, if the predetermined minimum is equal to two NIL activities, and based on the total payout amount defined by the contract and the student athletes determined fair market value the management server 102 determines that only one NIL activity is required to be performed, the management server 102 may automatically adjust the determined number of NIL activities to be two. In other embodiments, the management server 102 may determine the number of NIL activities based on the organization with which the contract is made, the total payout amount of the contract, and the student athletes fair market value. For example, a first organization may have data stored on database 110 that indicates that the organization requires for every $1000 of payout defined by the contract, student athletes with a market value between $1000-$7999 require four NIL activities, student athletes with a market value between $8000-$14999 require three NIL activities, and student athletes with a market value equal to or greater than $15000 require two NIL activities. As such, the management server 102 may automatically determine the number of NIL activities in accordance with the requirements set forth by the organization. It will be understood that the monetary values and number of NIL activities outlined above are examples intended to facilitate understanding of the different embodiments discussed herein.

In the above discussed embodiments, three variations of the management server 102 automatically determining a number of NIL activities are discussed. It should be understood though that the three variations are intended as non-limiting examples and that the management server 102 may automatically determine a number of NIL activities to be performed in accordance with other sets of rules. In some embodiments, the management server 102 may be configured to prioritize one set of rules for determining a number of NIL activities over another. For example, if a student athlete has a first contract with a first organization and a second contract with the second organization, the management server 102 may apply different rules when determining the number of NIL activities to be completed by the student athlete for each contract. For example, the first organization may have contract specific requirements (e.g., amount of NIL activities based on contract amount and/or student athlete market value) and the second organization may not. The management server 102 may automatically determine the number of NIL activities for the first organization in accordance with the first organizations requirements and may automatically determine the number of NIL activities for the second organization in a non-organization specific manner (e.g., based on a student athlete specific NIL activity value). The database 110 may have stored thereon, organization specific data relating to any requirements for monetary payments in relation to NIL activities (e.g., such as previously described and/or as described below). As such, the management server 102 may receive the organization specific information when automatically determining the number of required NIL activities in association with a contract.

In some embodiments, an administrator 112 may associate the student athlete with any number of organizations and/or contracts. For example, the administrator 112 may select the "Add Organization" button 214 shown in FIG. 2L to repeat the process illustrated in FIGS. 2K-2L any number of times. In some embodiments, the profile tab display field 208a may display another button (not shown) that is similar to button 214 that enables an administrator to associate another contract with the organization and student athlete. Put another way, the management server 102 may be configured to associate a single student athlete and organization with one or more contracts. For sake of brevity, only a single organization and contract is being associated with the student athlete in FIGS. 2K-2L.

Figure 2M:
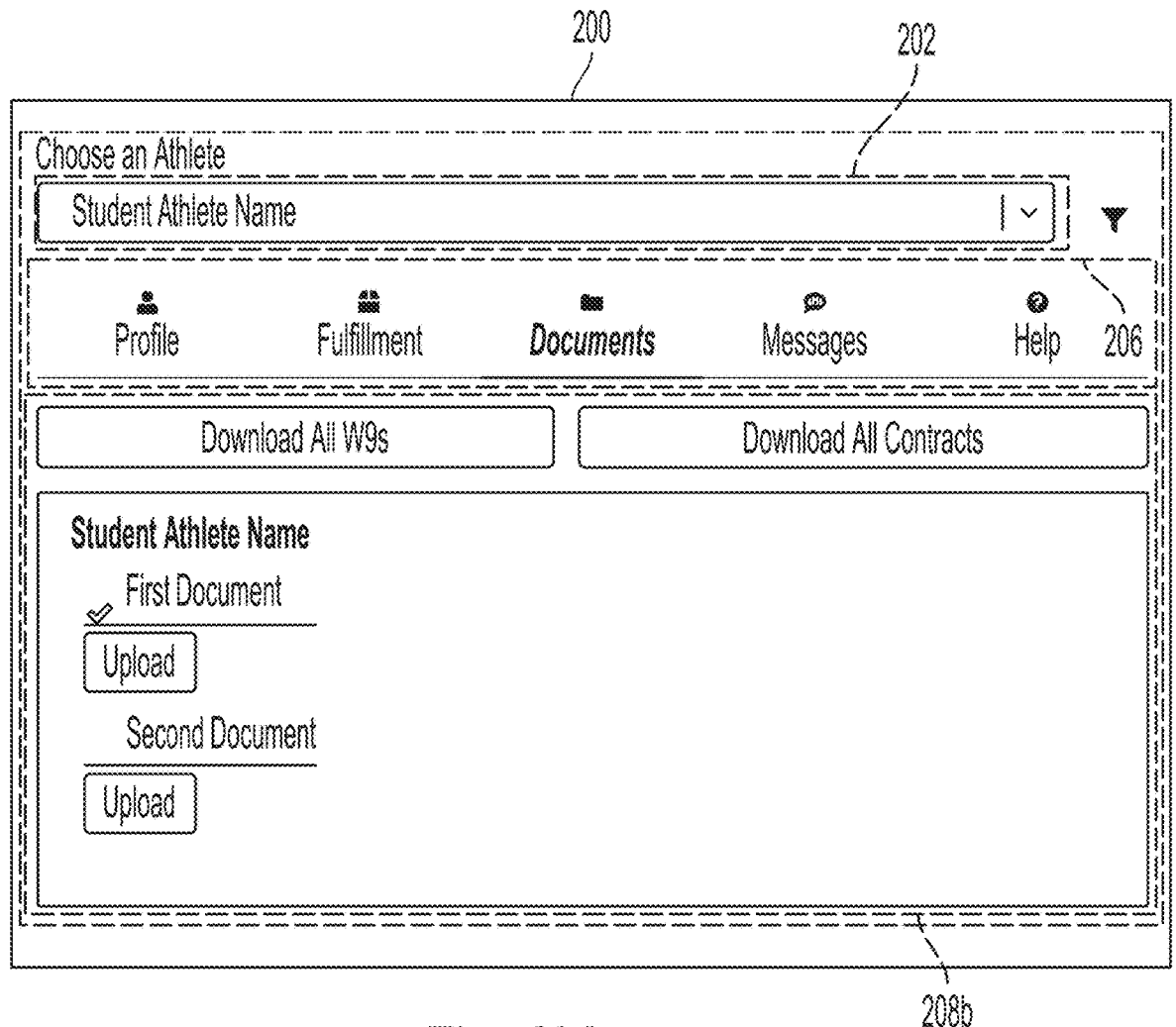

Referring to FIG. 2M, in some embodiments, in response to a user (e.g., an administrator 112) associating a student athlete with an organization and creating a contract between the student athlete and the organization, via the administrator UI 200, the management server 102 may be configured to determine that one or more documents are required to be signed by the student athlete and/or organization. For example, the administrator 112 may select the documents tab displayed on the menu bar 206 to cause the management server 102 to transmit to the client device 108 displaying the administrator UI 200, a documents tab display field 208b. The documents tab display field 208b may include a listing of all documents signed by, or which require signatures from, the student athlete. It will be understood that the student athlete selected by the administrator 112 at the athlete selection drop-down menu 202 as illustrated in FIG. 2M is the same student athlete the administrator 112 added to the system 100 in FIGS. 2C-2J. As illustrated, there is a first document and a second document displayed to the administrator 112 at the documents tab display field 208b. In the example illustrated in FIG. 2M, the first document has been signed, or completed, by the student athlete, which is indicated to the administrator 112 via a visual indication (e.g., a check mark). The second document has not been signed, or completed by the student athlete which is indicated to the administrator 112 via a second visual indication (e.g., lack of a check mark, an X-shaped mark). For sake of illustrating exemplary embodiments of the present disclosure, it will be assumed that the second document was automatically generated by the management server 102 in response to the administrator 112 inputting the student athlete specific information, the organization specific information, and the contract specific information (e.g., as illustrated in FIGS. 2C-2L).

The documents required to be signed may be documents relating to the contract defined by the administrator 112 (e.g., the contract defined by administrator 112 in FIG. 2L). The one or more documents may be legally binding documents and/or tax form documents required to be signed by the student athlete, organization, or both, before fulfillment of NIL activities and/or monetary payment therefor may be disbursed to the student athlete.

In some embodiments, the management server 102 may be configured to determine a type of document required to be signed by one or more of the student athlete and organization based on at least one of the type of organization, the age of the student athlete, the contract amount, a geographic location where the organization is based out of (e.g., what state the organization is based in), a citizenship status of the student athlete, the college or university the student attends, and the state in which the student athlete is a citizen. For example, if the organization is a charity, the management server 102 may determine that a first type of document is required to be signed by the student athlete and if the organization is a limited liability company, the management server 102 may determine that a different type of document is required to be signed by the student athlete. For sake of brevity, not every possible document will be described herein, however it will be understood that the management server 102 generally determines one or more documents for signature by the student athlete and/or organization based on any number of factors.

In some embodiments, the documents display tab 208a may enable the administrator to upload a digital copy or scan of a physical document for storage in database 110. For example, in an instance where a student athlete receives the second document for signature, generates a physical copy of that document (e.g., prints the document), signs the physical copy, and transmits the signed physical copy to an administrator 112 directly (e.g., via email, fax, physical mail), the administrator 112 may upload a digital copy of the signed physical copy to the management server 102 via the documents display tab field 208b to be stored in database 110. In the example illustrated in FIG. 2M, the management server 102 automatically generates the second document that requires a signature from the student athlete before the second document may be displayed as signed and/or completed on the documents tab display field 208b. In some embodiments, the documents tab display field 208b may allow a user to selectively download all of one or more standard documents such as, but not limited to W9 tax forms and/or all contracts associated with one or more student athletes.

Figure 2N:
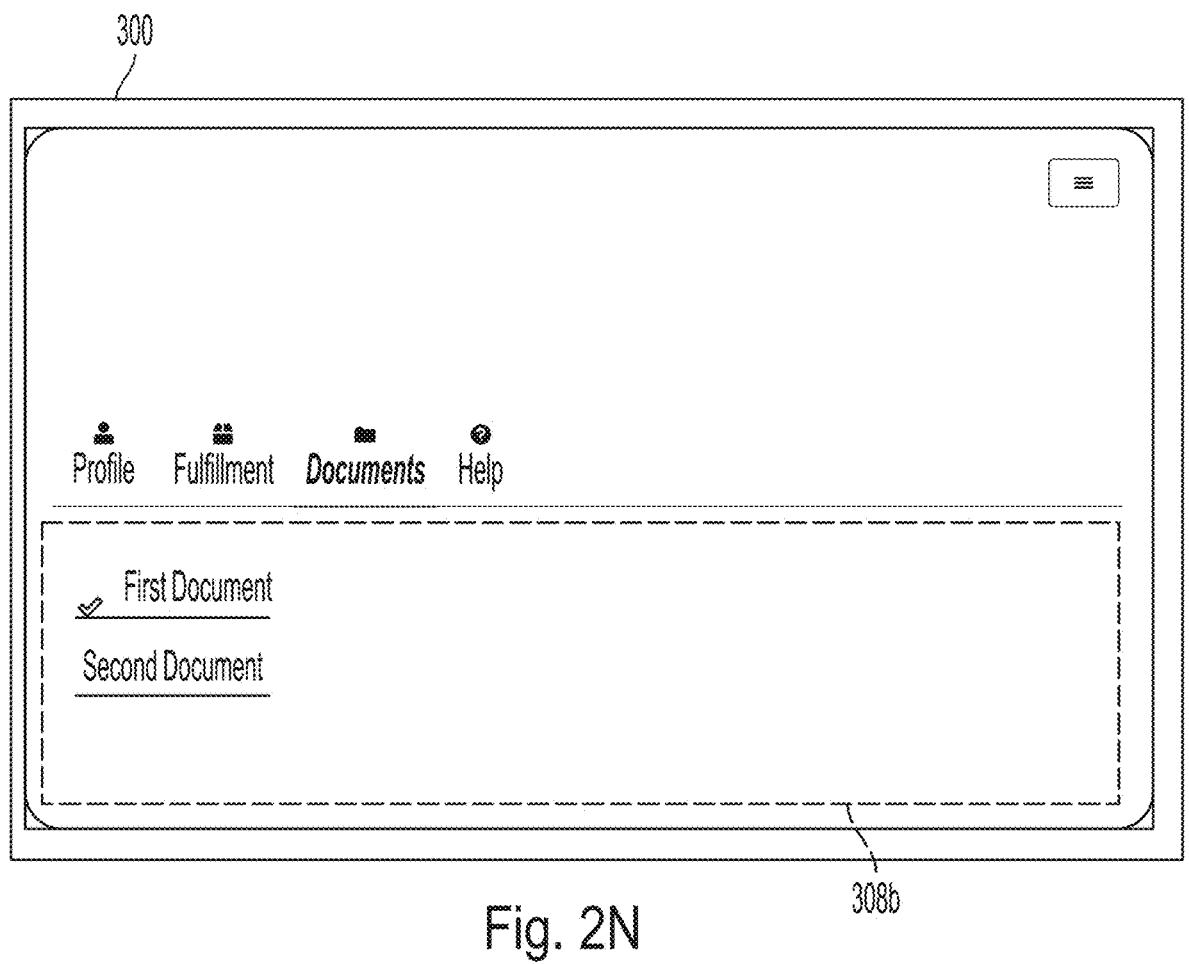
Figure 20:
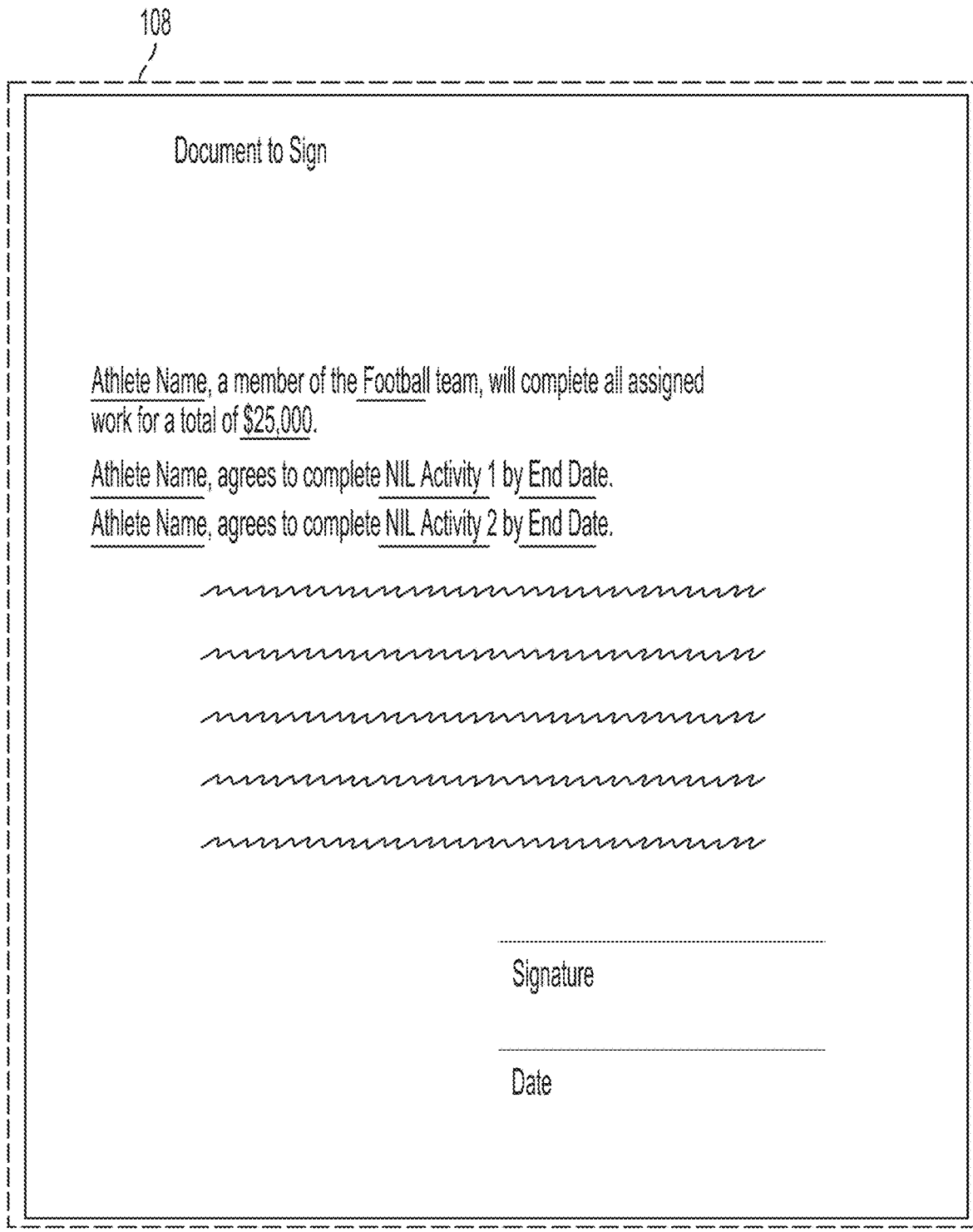

Referring to FIG. 2N, in response to the management server 102 generating the second document for signature by the student athlete, the management server 102 may transmit an indication to a non-administrator facing UI 300 that there are one or more documents that require the student athletes signature. For example, in FIG. 2N, there is shown a non-administrator facing user interface 300 transmitted from the management server 102 to a client device 108 for display to a non-administrator 114 (e.g., the student athlete). The non-administrator facing user interface 300 includes a documents tab display field 308b that is generally the same as the documents tab display field 208b displayed on the administrator facing UI 200 except that it does not include one or more functionalities of the documents tab display field 208b. For example, the documents tab display field 308b may only enable a non-administrator 114 to access documents they have previously signed and/or documents they are required to sign. The documents displayed at the documents tab display field 308b for non-administrators 114 may correspond to the documents displayed at the documents tab display field 208b for administrators 112. For example, the first document and second document displayed at the documents tab display field 308b correspond to the first and second documents displayed at the documents tab display field 208b shown in FIG. 2M.

Referring to FIG. 2O, the non-administrator 114 (e.g., the student athlete) may select the second document to sign. In response to the student athlete selecting the second document to sign, the management server 102 may transmit for display at the non-administrator UI 300, the second document to be signed. The document to be signed, in this example is a contract between the student athlete and the organization as illustrated in the previous user interfaces. As such, the document to be signed may include a listing of specific NIL activities to be performed by the student athlete. It will be understood that the document illustrated in FIG. 2O and the text displayed thereon is meant to illustrate exemplary embodiments of the present disclosure.

In some embodiments, in response to selecting the second document, the management server 102 may transmit the second document to a third-party server external to the system 100 that is configured to facilitate electronic viewing and signature of the second document by the student athlete. For example, the management server 102 may cause the client device 108 that is displaying the non-administrator UI 300 to open a web-browser page hosted by the third-party server such that the student athlete is able to review and sign the second document. What is shown in FIG. 2O is an illustration of the second document with some example text which includes the name of the student athlete, the sport the student athlete plays for their respective college or university, and a contract amount. It will be understood however, that what is shown in FIG. 2O is meant as a non-limiting example and that a document for signature by the student athlete may be any document. For sake of brevity, it will be assumed that the student athlete signs the document.

In response to the student athlete signing the document, a digital copy including the signature of the student athlete may be transmitted to the database 110 for storage. Furthermore, the management server 102 may cause the documents tab display fields 208b and/or 308b to update to provide a visual indication (e.g., a check mark) that the document has been signed by the student athlete.

Figure 3A:
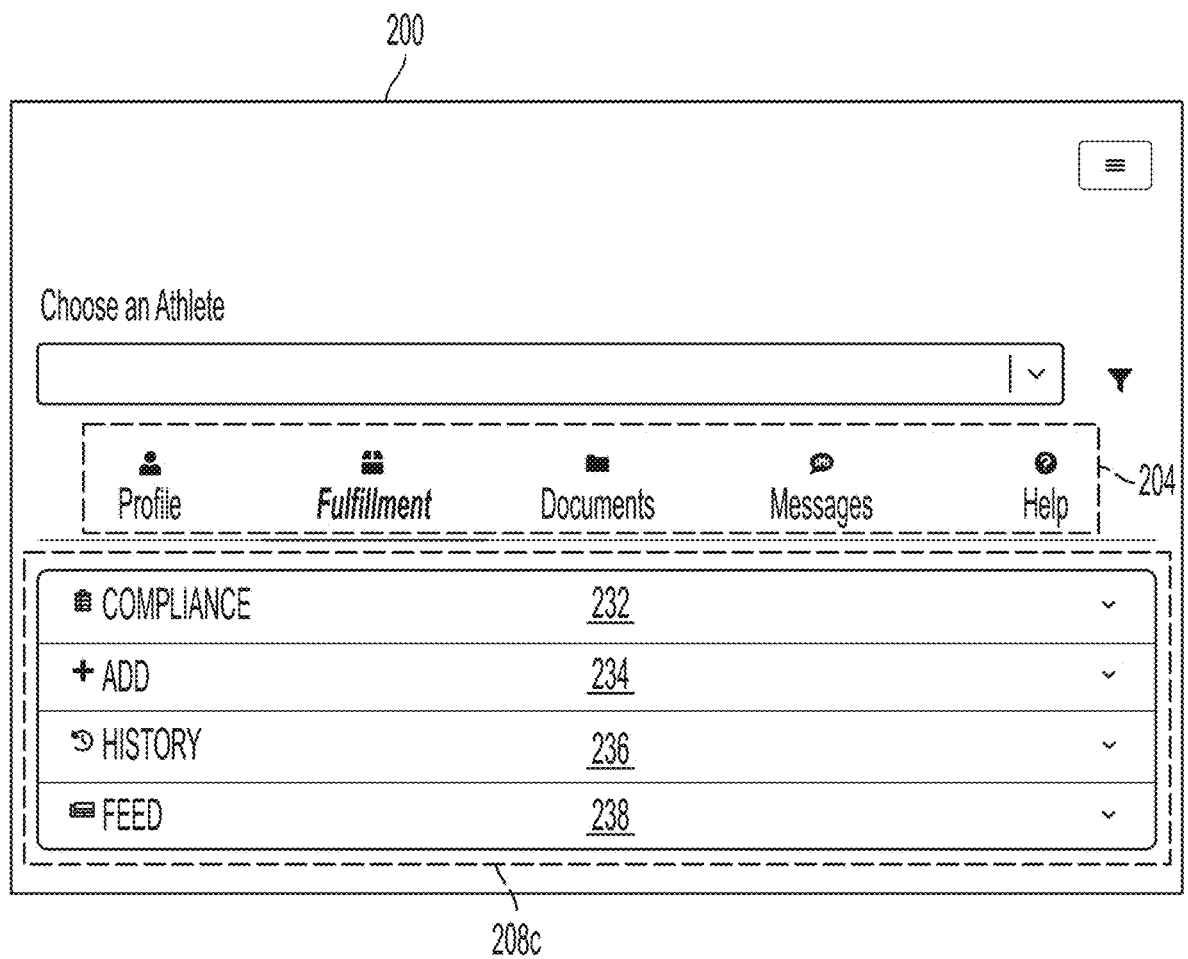
FIGS. 3A-3B illustrate exemplary user interfaces generated by the management server associated with a method of automatically determining fulfillment of NIL activities.
Figure 3B:
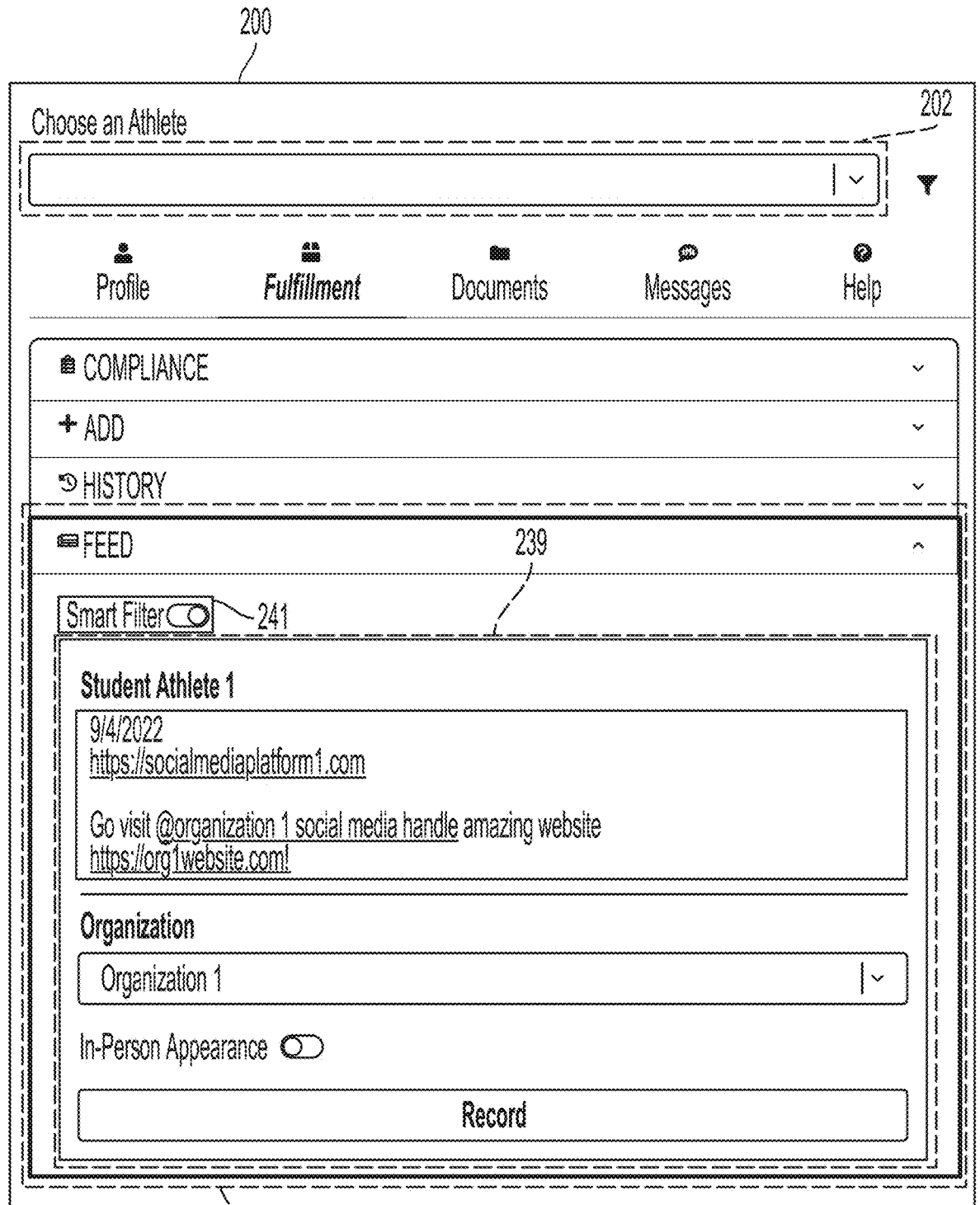

Referring to FIGS. 3A-3B there are shown exemplary user interfaces generated by the management server 102 and displayed on a client device 108. The exemplary user interfaces shown in FIGS. 3A-3B may be associated with a method of automatically determining fulfillment student athlete NIL activity fulfillment according to exemplary embodiments of the present disclosure. The student athlete NIL activities to be performed may be defined by contract specific information stored on database 110. In some embodiments, a user may navigate to a URL via a web-browser or access via a smartphone software application the UIs illustrated in FIGS. 3A-3B. The user-interfaces (UIs) illustrated in FIGS. 3A-3B are displayed on a web-browser of a desktop or laptop computer, however, it will be understood though that the UIs may be displayed on any other computing device (e.g., a smartphone, a tablet). In some embodiments, a user may be presented with a login screen in which the user must input credentials specific to the management server 102 in order to access the UIs shown in FIGS. 3A-3B.

As discussed above, NIL activities may be activities that are performed by a particular student athlete in accordance with a contract between the particular student athlete and a particular organization. The NIL activities may include, but are not limited to, social media posts and in person appearances. The database 110 may store a record of all fulfilled and unfulfilled NIL activities associated with a student athlete. For example, the database 110 may have stored thereon a plurality of contract specific data each of which may include an indication of a specific student athlete, a specific organization, a contract total payout amount, a length or term of the contract, a listing of NIL activities required to be fulfilled by the specific student athlete, and/or a listing of all fulfilled NIL activities. The management server 102 may be configured to monitor NIL activities of a plurality of student athletes in real-time and transmit to the database 110 an indication of whether or not a specific NIL activity has been fulfilled by the student athlete. In some embodiments, the management server 102 is configured to interact with one or more social media platform servers 104a-104n based on student athlete specific data, organization specific data, and/or contract specific data stored on the database 110 in order to automatically determine fulfillment NIL activities related to social media posts, as described in more detail below.

Referring to FIG. 3A, the management server 102 may transmit the administrator facing UI 200 for display at a client device 108. The administrator 112 may select the "Fulfillment" tab from the tab menu 206 to cause the fulfillment tab display field 208c to be displayed to the administrator 112. The fulfillment tab display field 208c may enable the administrator 112 to search for, view the status of, and/or approve NIL activities performed by one or more student athletes in accordance with contractual obligations associated with those student athletes. In some embodiments, the management server 102 enables an administrator 112 to perform various functions related to the NIL activities for a plurality of student athletes simultaneously. The fulfillment tab display field 208c may include one or more interactable drop-down menus related to different NIL activity actions accessible to an administrator 112. For example, the fulfillment tab display field 208c may include a compliance monitoring drop-down menu 232, a manual entry drop-down menu 234, a history drop-down menu 236 and a feed drop-down menu 238.

Referring to FIG. 3B, there is shown an exemplary user interface illustrating a method of monitoring NIL activities performed by one or more particular student athletes and automatically determining the compliance of the monitored NIL activities in accordance with an exemplary embodiment of the present disclosure. The management server 102 may be configured to actively monitor one or more social media posts generated by one or more particular student athletes and automatically determine whether the social media posts are in compliance with, or fulfill, one or more NIL activities associated with the particular student athlete(s). The one or more NIL activities associated with the particular student athletes may be included in contract specific information stored on database 110. For example, a particular student athlete may have five different contracts with one or more organizations, each contract including one or more NIL activities required to be performed by the particular student athlete in order to fulfill the terms of the corresponding contract.

Each contract may have corresponding contract specific information stored on database 110. Contract specific information is discussed in more detail above, however it should be understood that NIL activity information may be included in the contract specific information. For example, NIL activity information may include, for each NIL activity included in a contract: the type of NIL activity to be performed, a date which the NIL activity is agreed to be performed by, and an indication of whether the NIL activity has been performed. The contract specific information may also include an indication as to the particular student athlete and the particular organization with which the corresponding contract is between. As such, the management server 102 may determine, based on the indication of the particular student athlete, and the particular organization, corresponding social media handles for each. For example, the database 110 may transmit to the management server 102, the social media handles for the particular student athlete and particular organization such that the management server 102 may monitor social media posts associated with the particular student athletes social media handle (e.g., posts generated by the student athlete on a particular social media platform) and automatically determine from the content of each post, whether there is an indication of the particular organization (e.g., whether the post includes the organizations corresponding social media handle).

Still referring to FIG. 3B, in some embodiments, the management server 102 may transmit for display at a client device 108 a feed of social media content generated by one or more social media accounts associated with one or more student athletes. For example, at the administrator facing UI 200, the user (e.g., administrator 112) may select the feed drop-down menu 238. In response to the user selecting the feed drop-down menu, the management server 102 may generate a feed of social media content and transmit the feed to the client device 108 displaying the administrator facing UI 200. A feed of social media content may refer to a listing of content (e.g., social media posts, text, images, video, audio) publicly available at one or more social media platforms. In some embodiments, the management server 102 is configured to determine the listing of content that forms the feed of social media content by extracting data from one or more social media platforms. For example, the management server 102 may be configured to interface with one or more social media platform servers 104 via an API and/or perform web scraping on websites hosted by one or more social media platform servers 104.

In some embodiments, the management server 102 may interface with a plurality of social media platforms via any combination of API and/or web scraping. For example, there may be an API associated with a first social media platform 104a and as such, the management server 102 may transmit requests for first social media content data to the first social media platform 104a via the associated API and may similarly receive social media content data from the first social media platform 104a via the associated API. Further to this example, there may be another social media platform 104n for which no API may be available. As such, the management server 102 may perform web scraping on a website (e.g., a social media website) hosted by the social media platform 104n in order to extract second social media content data specific to the social media platform 104n. The extraction of social media content data, as referenced herein, may generally refer to instances where the management server 102 interfaces directly with a social media platform server 104 or instances where the management server 102 performs web scraping of a website hosted by a social media platform server 104. As such, the management server 102 may be configured to extract social media content data from a plurality of separate and distinct social media platforms and/or associated servers 104.

In some embodiments, extraction of social media content data from one or more social media platforms and/or associated servers 104 is specific to one or more student athletes having student athlete information stored on database 110. The student athlete specific information may include one or more social media handles and an indication as to which social media platform each social media handle is associated with. For example, a particular student athlete may have a first social media handle associated with a first social media platform, and a second social media handle associated with a second platform. As such, the management server 102 may extract social media content data to be displayed at the feed display drop-down menu 238 based on the specific social media platforms and corresponding social media handles associated with the student athlete specific information stored on database 110.

For example, the management server 102 may determine that a particular student athlete (e.g., student athlete 1) has a first social media handle (e.g., "@studentathlete1") associated with a first social media platform (e.g., social media platform 1) based on the corresponding student athlete specific information stored on database 110. The management server 102 may extract social media content data at a website of and/or social media platform server 104 for the first social media platform that was generated by the student athletes first social media handle. Put another way, the management server 102 may extract social media content data posted by the particular student athlete based on their public social media handle information that is stored on database 110.

In some embodiments, the management server 102 is configured to extract social media content data at a predetermined interval. For example, the management server 102 may be configured to extract social media content data automatically at a predetermined interval of, but not limited to: every minute, five minutes, ten minutes, thirty minutes, every hour, every twelve hours, every day, every other day, or every week. In some embodiments, the predetermined interval for extracting social media content data may be any value (e.g., in order of seconds, minutes, hours, day, weeks, and/or months) input by an administrator 112. In other embodiments, the management server 102 is configured to continuously extract social media content data in real time. In other embodiments, the management server 102 is configured to extract social media content data only in response to the user selectin the feed display drop-down menu 238. In some embodiments, the management server 102 is configured to extract social media content that was generated within a predefined amount of time. For example, the management server 102 may only extract social media content data that was generated within about one to three months from when the extraction occurs.

FIG. 3B illustrates an example of displaying social media content data extracted by the management server 102 at the client device 108. The extracted social media content data may include data relating to one or more separate and distinct social media content events or instances, generally referred to social media event data or event datasets, in which the student athlete generated social media content. For example, the one or more separate and distinct social media content events or instances may be separate and distinct social media posts generated by a student athlete via their corresponding social media account. Data relating to each social media event may be displayed at the feed display drop-down menu 238 within a separate and distinct event display field 239. For example, in FIG. 3B, there is shown a single event display field 239 including data specific to a social media post generated by a particular student athlete (e.g., student athlete 1) and extracted by the management server 102. The data displayed at each event display field 239 may include, but it not limited to, the name of the student athlete, the date the social media post was generated by the student athlete, a web address or URL for the social media post, and content included in the social media post (e.g., text, images, video, audio).

In some embodiments, the management server 102 may be configured to automatically associate a social media event generated by a particular student athlete with a NIL activity required to be performed by the student athlete, based on the corresponding extracted social media event data. The contract specific information stored on database 110, as discussed above, includes an indication of a particular student athlete, a particular organization, the status of NIL activities required by the corresponding contract, and whether a NIL activity is required to be a social media post. The indication of the particular organization may be any combination of the name of the organization, one or more web addresses owned by and/or associated with the organization, and/or one or more social media handles for the organization.

The management server 102 may compare the data for a particular social media event to the contract specific information stored on database 110 in order to determine compliance with a particular NIL activity required by a particular contract. In some embodiments, the management server 102 may search the content included in the social media post for an indication of the particular organization associated with the particular contract. For example, in FIG. 3B, the content included in the social media post, and displayed at the event display field 239 includes the text "Go visit @organization 1 social media handle amazing website https://org1website.com". The management server 102 may compare the text included in the content of the particular social media post to one or more indications of the particular organization stored on database 110 and determine that there is a match. For example, at least one of the organizations social media handle (e.g., "@organization 1 social media handle" and/or the organizations web address (e.g., "https://org1website.com") included in the social media event data may match what is stored on database 110 for that particular organization. In this manner, the management server 102 may determine that there is a match between the particular social media event data and the particular contract specific information stored on database 110.

In some embodiments, the event display field 239 may include a visual indication of the organization match automatically determined by the management server 102. For example, there may be an interactable organization field that displays to the user, which particular organization the management server 102 determined is indicated in the social media event data. A user may interact with the displayed organization field to confirm and/or edit the determined organization. For example, the organization determined by the management server 102 and displayed at the interactable organization display field in FIG. 3B is organization 1. In the event the user determines that the automatic determination by the management server 102 is incorrect, the user may manually edit or change the determined organization. For sake of brevity, it will be assumed in FIG. 3B that the management server 102 correctly determined the organization indicated in the social media event data and that no manual edit by the user was performed.

In response to the management server 102 determining that there is a match between the social media event data and contract specific information, the management server 102 may transmit to the database 110 an indication that a NIL activity included in the particular contract specific information has been fulfilled. In response to the database 110 receiving the indication of NIL activity fulfillment from the management server 102, the database 110 may be automatically updated to include the indication that the NIL activity has been fulfilled. In this manner, the management server 102 may automate the monitoring and tracking of NIL activity fulfillment in accordance with one or more contracts. In other embodiments, the management server 102 may be configured to require user input at the event display field 239 before transmitting to the database 110 the indication that a NIL activity has been fulfilled. For example, the event display field 239 may include a record button, that the user may interact with to cause the management server 102 to transmit the indication of NIL activity fulfillment to the database 110.

Although a single event display field 239 is shown in FIG. 3B for sake of brevity, it will be understood that there may be a plurality of event display fields 239 each corresponding to different social media events generated by one or more student athlete's social media accounts. For example, if there are three student athletes each having student athlete specific information stored on database 110, the management server 102 may extract social media content data specific to those three student athletes. Each of the three student athletes may have generated any number of social media events and the management server 102 may generate social media event data for each and display at the feed display drop-down menu 238, an event display field 239 corresponding to each of the social media events.

In some embodiments, the management server 102 is configured to extract social media content data specific to student athletes having one or more unfulfilled NIL activities indicated in contract specific information associated with the student athletes and stored on database 110. For example, if a first contract specific information includes an indication of a first student athlete and at least one unfulfilled NIL activity, and a second contract specific information includes an indication of a second student athlete and no unfulfilled NIL activities, the management server 102, when extracting social media content data, may only extract social media content data associated with the first student athlete.

In some embodiments, the management server 102 may be configured to determine one or more social media events including a possible indication of a particular organization having organization specific information stored on database 110 from a plurality of social media event data. Put another way, the management server 102 may be configured to filter out any social media events generated by one or more student athletes that are not related to contract specific information stored on database 110. For example, when extracting social media content data, the management server 102 may extract data for all social media events generated by one or more particular student athletes within a period of time. The management server 102 may filter the extracted data by removing all social media events data having no indication of an organization having organization specific information stored on database 110. For example, if first social media event data includes only the text "had a great weekend" and a second social media event data includes the text "Had fun visiting 'organization 1' this weekend", the management server 102 may automatically filter out the first social media event data and may not display an event display field 239 for the first social media event data. In some embodiments, the feed display drop-down menu 238 may include a filter toggle button 241 that allows the user to select whether the management server 102 filters social media event data.

Figure 4A:
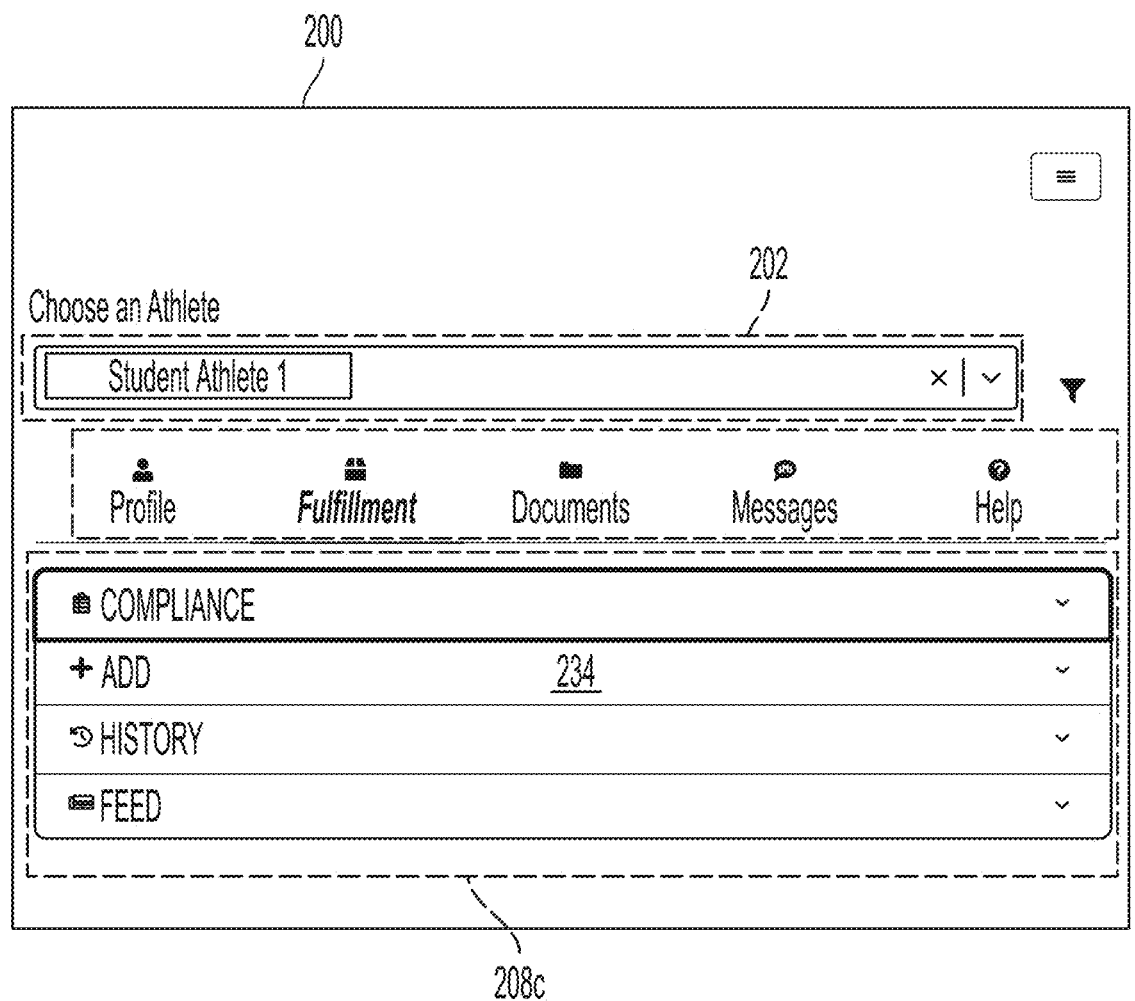

Referring to FIGS. 4A-4B, there are shown exemplary user interfaces illustrating a method of manually entering NIL activity information associated with a particular student athlete in accordance with an embodiment of the present disclosure. The management server 102 may be configured to enable a user (e.g., administrator 112, non-administrator 114) to manually input NIL activity fulfillment information associated with one or more particular student athletes for storage at database 110. For example, the manual entry drop-down menu 234 displayed at the fulfillment tab display field 208c may enable a user to input NIL activity fulfillment information. The NIL activity fulfillment information may be information associated with the fulfillment of one or more NIL activities that were not automatically captured by system 100. For example, the manual entry drop-down menu 234 may enable a user to input information associated with in person appearances and/or social media posts performed by one or more student athletes in accordance with contractual obligations.

In FIG. 4A, while the administrator facing user interface 200 is displaying the fulfillment tab display field 208c, an administrator 112 may input a selection of a particular student athlete (e.g., student athlete 1) at the athlete selection drop-down menu 202. The administrator 112 may select the manual entry drop-down menu 234 in order to input NIL activity fulfillment information associated with the particular student athlete.

In FIG. 4B, in response to the administrator 112 selecting the manual entry drop-down menu 234, the menu 234 may expand to display one or more NIL activity fulfillment information input fields within which the administrator 112 may input NIL activity fulfillment information. The NIL activity fulfillment information input fields may include a web-address input field 244a within which the administrator 112 may input a web-address, or URL, associated with the NIL fulfillment activity. For example, the NIL activity may be a social media post made by the particular student athlete and the input web-address may be the web-address, or link, to the social media post. There may be a notes input field 244b within which the administrator 112 may input text associated with the NIL fulfillment activity. For example, the NIL activity may be a social media post and the text input at the notes input field 244b may be any text included in the social media post. There may be a file upload input field 244c to enable the administrator 112 to upload one or more files (e.g., text files, image files, video files, audio files) associated with the NIL fulfillment activity. For example, if the NIL activity is a social media post including an image, the administrator 112 may upload the image included in the social media post at the filed upload input field 244c.

There may be a date input field 244d to enable the administrator 112 to input a date associated with the NIL fulfillment activity. For example, if the student athlete performed the NIL activity on Sep. 1, 2022, the administrator 112 may input that date at the date input field 244d. There may be an organization input field 244e to enable the administrator 112 to input a particular organization associated with the NIL fulfillment activity. For example, the particular student athlete may perform the NIL activity in accordance with contractual obligations defined by a contract between the particular student athlete and a particular organization. As such, the administrator 112 may input at the organization input field 244e the particular organization for which the NIL activity was performed.

In some embodiments, the management server 102 may be configured to determine a list of available organizations that the administrator 112 may select from, based on the particular athlete selected at the athlete selection drop-down menu 202. For example, there may be a plurality of organizations (e.g., organizations 1-20) each having organization specific information stored on database 110. Furthermore, the particular student athlete may have one or more contracts with a subset of the plurality of organizations (e.g. organizations 3-5) as indicated by contract specific information stored on database 110. As such, the management server 102 may automatically determine which organizations the administrator 112 may select from at the organization input field 244e by querying the database 110 for a list of all the organizations included in contract specific information associated with the student athlete (e.g., organizations 3-5).

There may be an in-person appearance input field 244f to enable the administrator 112 to select whether the NIL fulfillment activity was an in-person appearance. For example, if the NIL activity performed by the particular student athlete was an in-person appearance, the administrator 112 may select the in-person appearance input field 244f to indicate that the NIL activity was an in-person appearance. In some embodiments, the visibility and/or value (e.g., true, false) for the in-person appearance input field 244f may be automatically determined by the management server 102 based on NIL activity specific information stored in the database 110. For example, if the NIL activity specific information includes an indication that an in-person appearance is required to be performed by the particular student athlete, the in-person appearance input field 244f may be displayed to the user. In some embodiments, there may be one or more other NIL activity type input fields (not shown) corresponding to the type of NIL activity performed and/or a particular social media platform where the NIL activity may be performed. For example, if there may be a NIL activity type input field corresponding to one or more different social media platform servers 104 in communication with the management server 102 to enable a user to input at which corresponding social media platform a NIL activity was performed. There may be an approval indication field 244g to enable the administrator 112 to select whether the NIL fulfillment activity is approved, or in other words, whether the NIL activity performed by the particular student athlete fulfils one or more contractual obligations.

In response to the administrator 112 inputting information at one or more of the NIL fulfillment activity input fields 244a-244g, the administrator 112 may interact with the add button 244h to cause the management server 102 to transmit the information input at fields 244a-244g to the database 110 for storage. In some embodiments, one or more of the NIL fulfillment activity input fields 244a-244g may be left blank by the administrator 112.

Although the manual entry of NIL fulfillment activity is illustrated with regards to an administrator 112 inputting information at the administrator facing UI 200, the management server 102 may be configured to enable a non-administrator 114 to input generally the same information. For example, the non-administrator facing UI 300 may display to a non-administrator 114 (e.g., a particular student athlete) NIL activity input fields that are generally the same as input fields 244a-244f, except that the approval indication field 244g may not be included. Additionally, in an instance where the non-administrator 114 is a particular student athlete, the management server 102 may automatically associate the information input by the particular student athlete with their student athlete specific information stored on database 110.

Figure 5A:
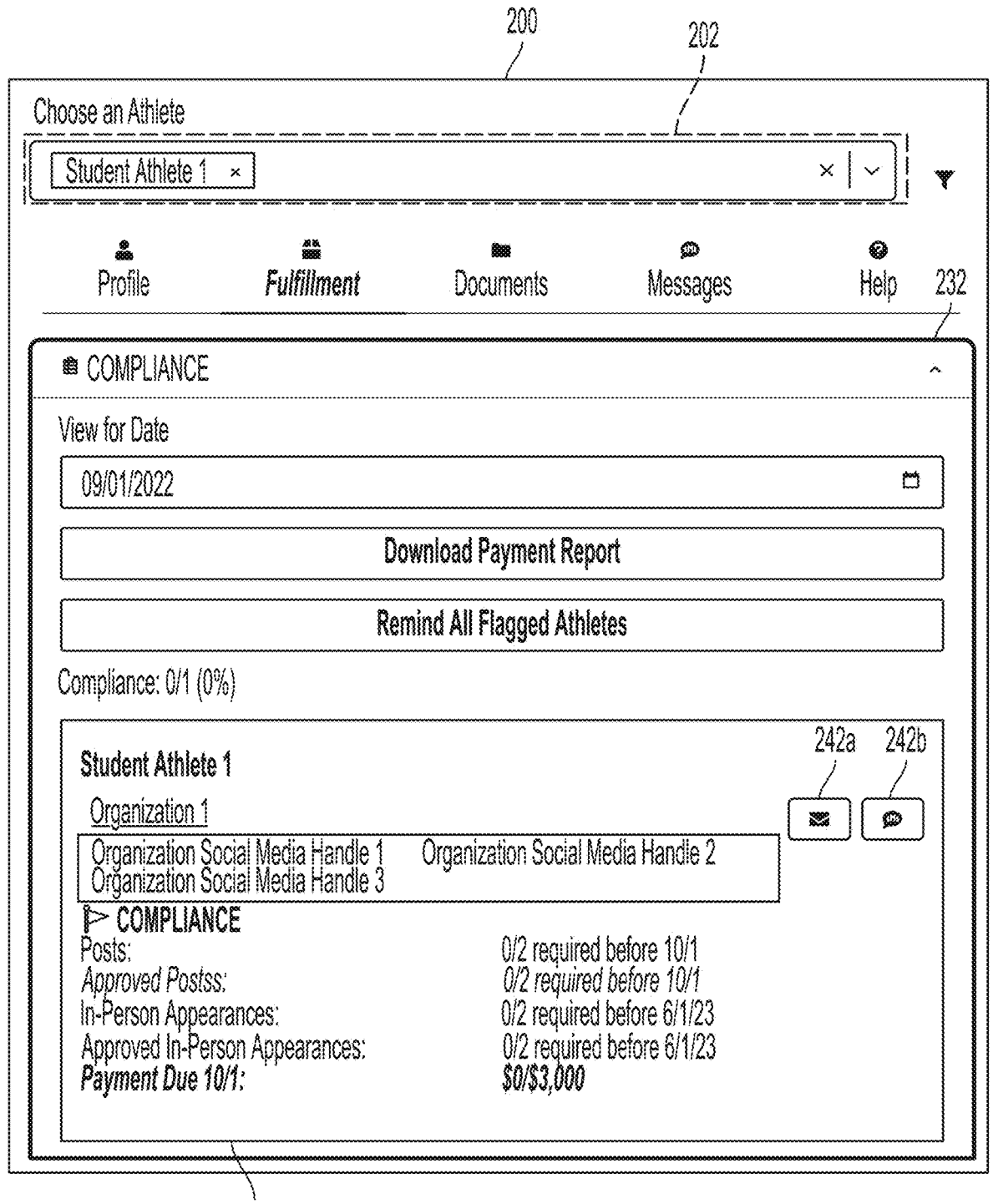
Figure 5B:
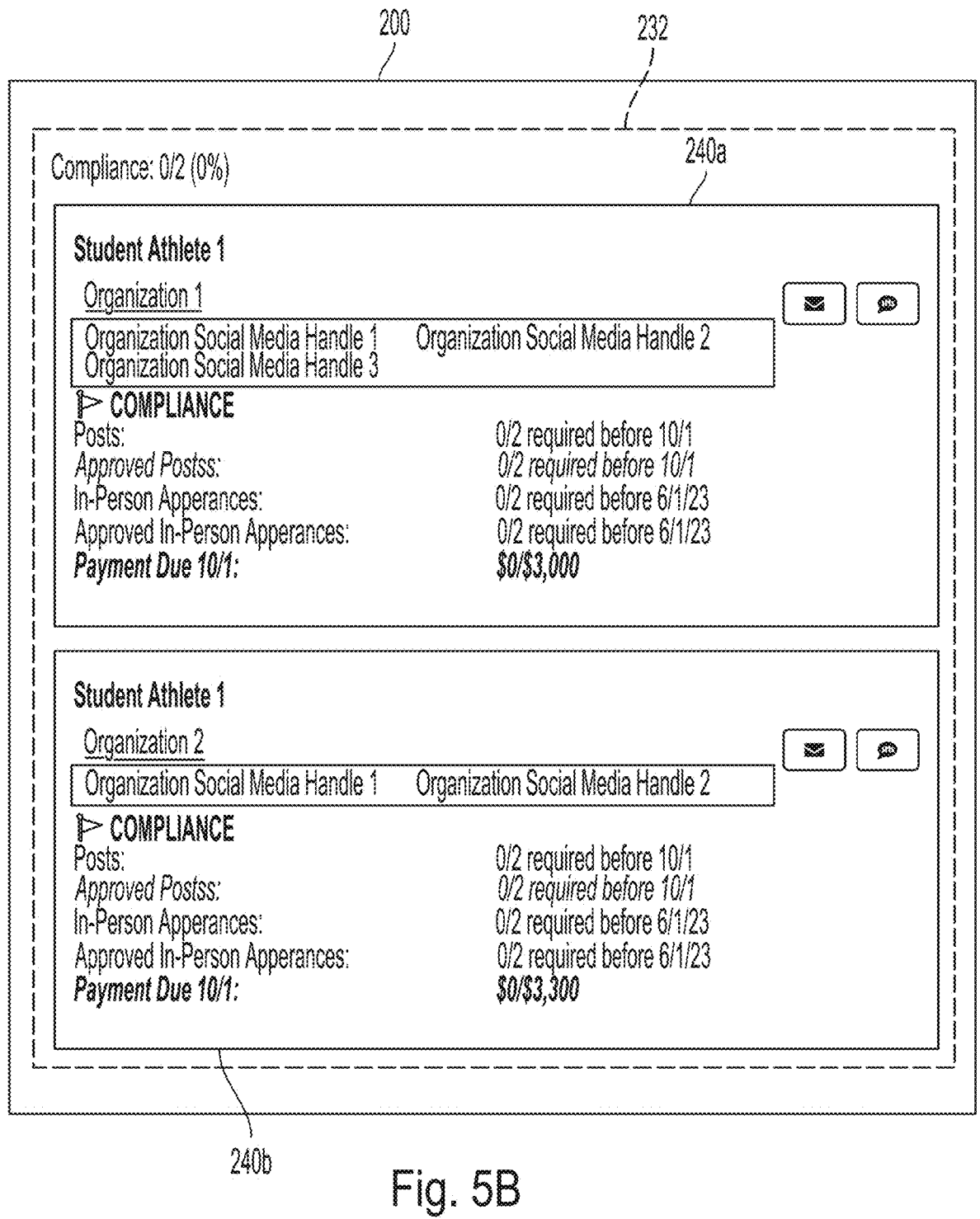

Referring to FIGS. 5A-5C, the user may select the compliance monitoring drop-down menu 232 to display information related to NIL activity compliance for one or more particular student athletes. The compliance monitoring drop-down menu 232, when selected by the user, may enable the user to view NIL activity specific information associated with one or more particular student athletes. For example, when selected, the compliance monitoring drop-down menu 232 may display at the client device 108 information specific to one or more NIL activities included in one or more contracts having contract specific information stored on database 110. The compliance monitoring drop-down menu 232, when selected by the user, may include a compliance information field 240 that displays to the user NIL activity specific information stored on database 110. In some embodiments, the compliance monitoring drop-down menu 232 may enable the user to generate payment reports associated with NIL activity specific information and/or transmit an electronic message to student athletes who have one or more unfulfilled NIL activities.

In FIG. 5A, the user (e.g., administrator 112) selects one or more particular student athletes at the athlete selection drop-down menu 202 in order to view NIL activity specific information associated with the particular student athletes. In response to the administrator 112 inputting a selection of one or more particular student athletes (e.g., "student athlete 1") at the athlete selection drop-down menu 202, the management server 102 may transmit a query to database 110 for NIL activity specific information included in contract specific information for the one or more particular student athletes. In some embodiments, the query may include the name of each of the particular student athletes and a request for contract specific information associated with each of the particular student athletes. In response to receiving the query, the database 110 may, based on the name of the particular student athlete, retrieve all NIL activity specific information associated with the particular student athlete. The NIL activity specific information may include contract specific information associated with the name of the particular student athlete and all organization specific information based on the retrieved contract specific information.

In response to retrieving the NIL activity specific information, the database 110 may transmit the retrieved information for the particular student athlete to the management server 102. The management server 102, in response to receiving the NIL activity specific information and display at the compliance information field 240 the NIL activity information specific to student athlete 1. In some embodiments, the NIL activity information displayed to the administrator 112 is grouped by contract and/or organization. For example, the compliance information field 240 may display to the administrator 112 NIL activity information that is specific to contract between the particular student athlete and a particular organization. In FIG. 5A, the compliance information field 240 displays NIL activity information specific to a contract between student athlete 1 and organization 1. It will be understood that any contract and/or organization information displayed at the compliance information display field 240 may be based on contract and/or organization specific information stored on database 110.

The information displayed at the compliance information field 240 may include one or more of: the name of the student athlete; the name of the organization with which the student athlete has formed a contract; one or more social media handles specific to the organization; an indication of whether the student athlete has any unfulfilled contractual obligations (e.g., NIL activities); a type and/or number of required NIL activities; one or more NIL activity deadlines; and a total payout amount for completing all of the required NIL activities defined by the contract. For example, in FIG. 5A, the compliance information field 240 includes the name of the student athlete and organization, three social media handles corresponding to the organizations social media accounts on three different social media platforms, a number of social media posts and in-person appearances (e.g., NIL activities) with deadlines as defined by the contract between the student athlete and organization, and the total payment due in response to the student athlete completing the required NIL activities.

In this manner, the compliance information field 240 may enable the administrator 112 to easily determine the status of one or more particular student athletes NIL activity fulfillment. For example, the administrator 112 may be able to quickly and easily determine based on the information displayed at the compliance information field that a particular student athlete has not completed any NIL activities associated with their contract with a particular student athlete. In some embodiments, the compliance information field 240 may include one or more interactable buttons 242a-242b to enable the administrator to send messages to the student athlete displayed at the compliance information field 240. There may be an email interactable button 242a that when selected by the administrator 112 causes the management server 102 to generate an email having text specific to the student athlete and their contract with the organization displayed at the compliance information field 240. For example, the email generated by the management server 102 may include text reminding student athlete 1 that they need to complete two social media posts before October $1^{st}$ of the current year and two in person appearances before June $1^{st}$ of the following year in accordance with their contract with organization 1 before they can receive the $3000 payout amount. There may also be a text message interactable button 242b having generally the same functionality as the email interactable button 242a except that in response to user input at the text message interactable button 242b the management server 102 may generate and send a text message, generally the same as described above, to a telephone number associated with the student athlete's specific information stored on database 110.

In some embodiments, the compliance monitoring drop-down menu 232 may enable the user (e.g., administrator 112) to send a reminder to all student athletes having one or more unfulfilled NIL activities. For example, the compliance monitoring drop-down menu 232 may have a remind all interactable button (e.g., "Remind All Flagged Athletes" button) that when selected by the administrator 112 may transmit an email and/or text message reminder to all student athletes having NIL activity specific information stored on database 110 indicating that there are one or more unfulfilled NIL activities.

In some embodiments, compliance monitoring drop-down menu 232 may enable the user (e.g., administrator 112) to filter NIL activity specific information displayed thereon by date. For example, there may be a date input filter field where the administrator 112 may input a date (e.g., day, month, year). The date input by the administrator 112 may be an indication of a request for contracts having a term defined by a start date and an end date that falls within the date input by the administrator 112. For example, the date input by the user in FIG. 5A is Sep. 1, 2022 and the contract specific information displayed at the compliance monitoring drop-down menu 232 may be filtered to contracts having a start date on or prior to Sep. 1, 2022 and an end date on or following Sep. 1, 2022.

In some embodiments, the NIL activity specific information displayed at the compliance information field 240 is specific to a particular payment period defined by the payout schedule. For example, the type and/or number of NIL activities to be performed by student athlete 1, as illustrated in FIG. 5A, may be specific to a single payment period as defined by the payout schedule. A payment period may be defined by the payment interval (e.g., every two weeks) as discussed above. As such, in FIG. 5A, for a next upcoming payment period, or a payment period falling within a date input at the date input filter field, student athlete 1 may be required to perform two in-person appearances and two social media posts prior to October 1 of the current year.

In FIG. 5A, only a single compliance information field 240 is shown, however, the number of compliance information fields displayed to the user may correspond to the number of contracts associated with the particular student athlete. For example, and as shown in FIG. 5B, the administrator 112 has selected a particular student athlete (e.g., "student athlete 1") at the athlete selection drop-down menu 202 and has selected to display the compliance monitoring drop-down menu 232. In this example the student athlete has two contracts each associated with a different organization and as such there are two compliance information fields 240a-240b displayed at the compliance monitoring drop-down menu 232. As shown, the first compliance display field 240a displays information for a first contract between particular student athlete and a first organization, and the second compliance display field 240b displays information for a second contract between the particular student athlete and a second organization. It will be understood that what is shown in FIG. 5B is an example and that there may be any number of compliance display fields 240 displayed at the compliance monitoring drop-down menu 232 for a particular student athlete. In some embodiments, there may be more than one contract associated with a particular student athlete and a particular organization. As such, there may be more than one compliance display field 240 displayed at the compliance monitoring drop-down menu 232 corresponding to each of the contracts between the particular student athlete and the particular organization.

For sake of brevity, only a single student athlete (e.g., student athlete 1) is selected at the athlete selection drop-down menu 202 in FIGS. 5A-5B. However, it will be understood any number of particular student athletes may be selected, by the administrator 112, at the athlete selection drop-down menu 202. In instances where more than one particular student athlete is selected at the athlete selection drop-down menu 202, the management server 102 may transmit for display at the compliance monitoring drop-down menu 232 NIL activity specific information associated with each particular student athlete in generally the same manner as described above with reference to FIGS. 3B-3C.

Referring to FIG. 5C, the management server 102 may be configured to transmit for display at the client device 108, NIL activity specific information for all student athletes having student athlete specific information stored on database 110. For example, the user (e.g., administrator 112) may select the compliance monitoring drop-down menu 232 in generally the same manner as described above with reference to FIGS. 5A-5B except that the user does not provide a selection of a particular student athlete at the athlete selection drop-down menu 202. In response to the administrator 112 selecting the compliance monitoring drop-down menu 232 without providing a selection of one or more particular student athletes, the management server 102 may transmit for display at the client device 108 NIL activity specific information for each student athlete having student athlete specific information and/or contract specific information stored on database 110 in generally the same manner as described above with reference to FIGS. 5A-5B. For example, the query transmitted from the management server 102 to the database 110 may not include a name of one or more particular student athletes and may instead only include a request for all contract specific information stored on database 110.

Figure 6:
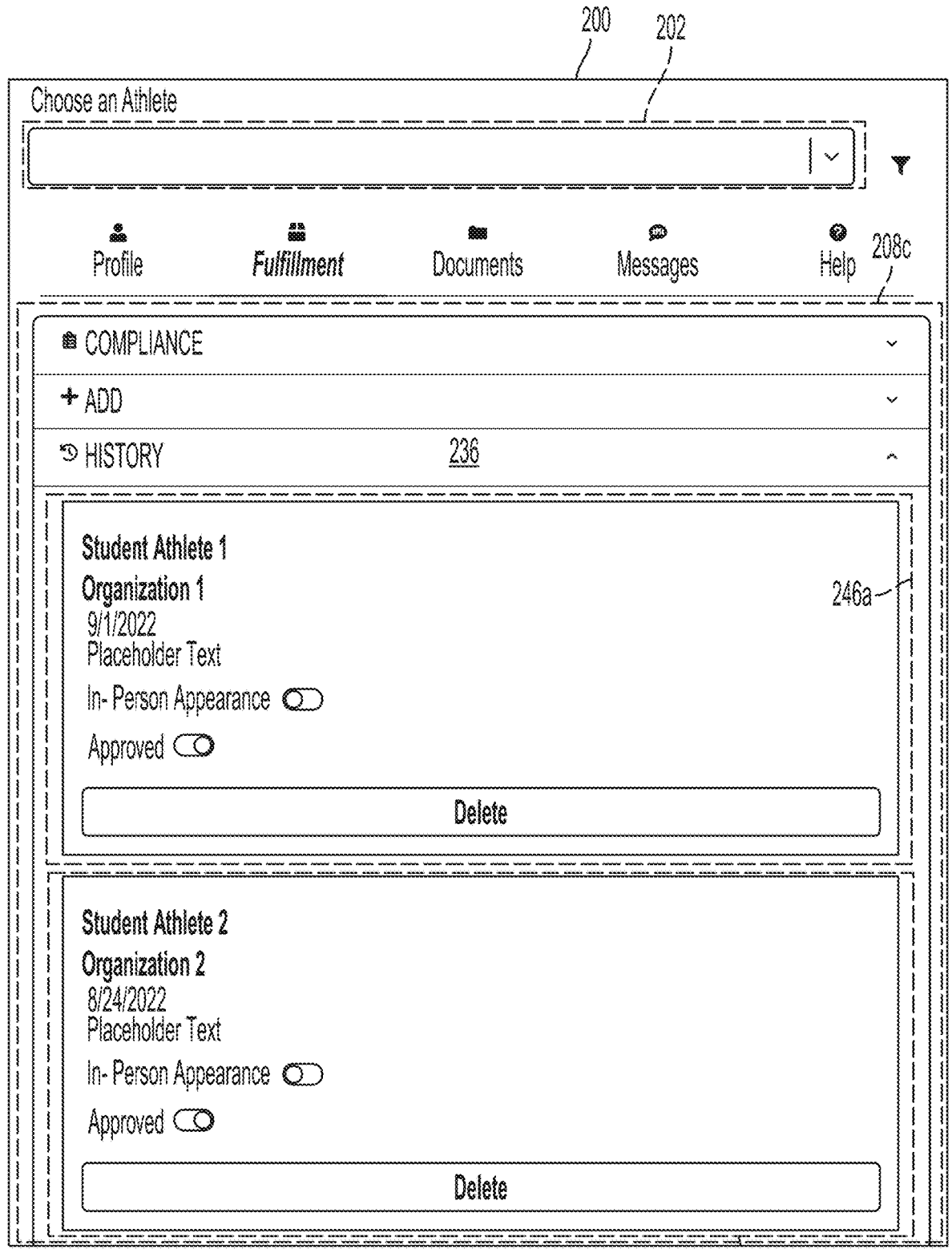
FIG. 6 illustrates an exemplary user interface generated by the management server associated with displaying historical NIL activity information to a user.

Referring to FIG. 6, in some embodiments, the management server 102 may be configured to transmit for display at a client device, data relating to one or more NIL activities having NIL activity specific information stored on database 110. The history drop-down menu 236 displayed at the fulfillment tab display field 208c may, when interacted with by a user, display historical data relating to one or more NIL activities performed by one or more student athlete. Historical data relating to one or more NIL activities may refer to NIL activity information, associated with contract specific information, that exists on database 110 at the time which the user selects the history drop-down menu 236. In some embodiments, in response to a user (e.g., administrator 112) selecting the history drop-down menu 236, the management server 102 may transmit a query to database 110 requesting NIL activity specific information stored thereon. In response to the database 110 receiving the query requesting NIL activity specific information, the database 110 may transmit the requested information to the management server 102. In response to receiving the NIL activity specific information, the management server 102 may generate one or more historical NIL activity display fields 246 and transmit them to the client device 108 for display.

For example, in FIG. 5, there are two historical NIL activity display fields 246a-246b displayed to the user at the client device 108. Although only two historical NIL activity display fields 246a-246b are illustrated in FIG. 5, it will be understood that any number of historical NIL activity display fields 246 displayed to the user. Each historical NIL display field 246 may include, but is not limited to, an indication of: the name of a particular student athlete, the name of a particular organization, the date the NIL activity was performed on, content (e.g., text, video, image(s), and/or audio) specific to the NIL activity, an indication of whether the NIL activity is an in-person appearance, and/or whether the NIL activity has been approved (e.g., whether it has been successfully fulfilled). In some embodiments, the query transmitted from the management server 102 to the database 110 may include one or more user specified criteria (s). For example, the user, at the athlete selection drop-down menu 202 may select one or more particular student athletes for which the user wishes to view historical NIL activity specific information. A user provide query criteria including one or more of: one or more sports, one or more student athletes, one or more organizations, and/or a date. For sake of brevity, in the example illustrated in FIG. 5, the user has provided no query criteria.

In some embodiments, each historical NIL display field 246 may enable a user (e.g., administrator 112) to select whether the displayed NIL activity was an in-person appearance and/or whether the NIL activity is approved. For example, in historical NIL display field 246a, an administrator 112 may interact with the in-person appearance toggle field to update the particular NIL activity to include an indication that it was an in-person appearance. Similarly, the user may interact with the approved toggle field to update the particular NIL activity to include an indication that it is not approved. As such, in response to the user input at a historical NIL display field 246, the management server 102 may transmit an updated record, based on the user input, to database 110 to update the corresponding NIL activity specific information stored thereon.

In this manner, the history drop-down menu 236 may enable the user (e.g., administrator 112) to quickly and easily view all historical data relating to NIL activity specific information stored on the database 110. In some embodiments, the historical data relating to NIL activity specific information stored on database 110 and transmitted from the database 110 to the management server 102 for display at the one or more historical NIL display fields 246 only includes NIL activities that have been approved. The historical data relating to NIL activity specific information stored on the database 110 may be generated through at least one of the automatic monitoring of NIL activity performed by management server 102 (as discussed above with reference to FIG. 3B) and/or the manual entry of NIL activity information by a user (as discussed above with reference to FIGS. 4A-4B).

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein. At least some of the figures and descriptions of the invention mention user-interface affordances (e.g., drop-down menu) that may be for illustrative purposes only and it will be understood that other affordances may be used.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A method of automatically determining fulfillment of services associated with service agreements between a first entity and a second entity, the method comprising:
   at the management server in communication with a database web-scraping content data at a plurality of web addresses for one or more websites to extract content data from the one or more websites and/or servers hosting the one or more websites to generate one or more separate and distinct event datasets, each event dataset including a unique digital identifier of a first entity having first entity specific data stored on the database;
   at the management server, determining, for each event dataset, whether the event dataset includes a unique identifier of a second entity having corresponding second entity data stored in the database;
   in response to the event dataset including an indication of the unique identifier of the second entity, at the management server, determining whether the unique identifier of the first entity is associated with the unique identifier of the second entity in the database; and
   in response to determining that the unique identifiers of the first and second entities are associated with one another, at the management server, causing a user interface to render at a client device the event dataset associated with the unique identifier of the first entity.

2. The method of claim 1, wherein there are a plurality of first entities and second entities and for each first entity, the corresponding unique identifier one or more social media handles associated with one or more social media platforms, and wherein for each second entity, the corresponding unique identifier includes one or more social media handles associated with the one or more social media platforms.

3. The method of claim 2, wherein the one or more websites and/or servers hosting the one or more websites are associated with the one or more social media platforms.

4. The method of claim 2, wherein at the management server, extracting content data includes retrieving, for each social media platform included in the one or more social media platforms and for each first entity:
- one or more social media posts associated with the first entity's corresponding social media handle; and
- generating social media post data for each of the one or more social media posts.

5. The method of claim 4, wherein determining whether the event dataset includes a unique identifier of the second entity further includes automatically determining, at the management server, that one or more social media post data includes organization specific information for a particular organization.

6. The method of claim 5, wherein the one or more social media post data includes text matching the social media handle corresponding to the second entity.

7. The method of claim 1, wherein the management server is configured to extract content data at a predetermined interval.

8. The method of claim 1, wherein the management server is in communication with the servers hosting the one or more websites via one or more server specific application programming interfaces.

9. The method of claim 1 further comprising:
- at the management server, automatically determining a fair market value for each particular first entity of the one or more first entities based on a weighted sum of two or more fair market value factors.

10. The method of claim 9 further comprising:
- at the management server, automatically determining, a payout amount associated with a fulfillment of a service agreement obligation between the first entity and the second entity, based on the determined fair market value.

11. The method of claim 10 further comprising:
- in response to the database including an indication that a service agreement obligation between the first entity and the second entity is fulfilled, at the management server, generating a disbursement of the payout amount to the first entity.

12. The method of claim 1 further comprising:
- at the management server, automatically extracting content data associated with a plurality of unique identifiers associated with a plurality of different first entities at a predetermined interval.

13. The method of claim 1 further comprising:
- at the management server, rendering at the user interface a live feed of extracted content data including an indication of the unique identifier of the first entity.

14. The method of claim 1, wherein filtering content data includes, for each event dataset, comparing text included in the event dataset to unique identifiers of a plurality of second entities stored in the database and removing from the content data all event datasets including no text matching any unique identifier of the plurality of second entities.

\* \* \* \* \*